(12) United States Patent
Mouri

(10) Patent No.: US 11,383,249 B2
(45) Date of Patent: Jul. 12, 2022

(54) WASHING TREATMENT SYSTEM AND WASHING TREATMENT METHOD FOR CONTAMINATED SOIL

(71) Applicant: SHIMIZU CORPORATION, Tokyo (JP)

(72) Inventor: Mitsuo Mouri, Tokyo (JP)

(73) Assignee: SHIMIZU CORPORATION, Tokyo (JP)

(*) Notice: Subject to any disclaimer, the term of this patent is extended or adjusted under 35 U.S.C. 154(b) by 0 days.

(21) Appl. No.: 17/274,517

(22) PCT Filed: Jul. 2, 2020

(86) PCT No.: PCT/JP2020/026025
§ 371 (c)(1),
(2) Date: Mar. 9, 2021

(87) PCT Pub. No.: WO2022/003903
PCT Pub. Date: Jan. 6, 2022

(65) Prior Publication Data
US 2022/0001394 A1 Jan. 6, 2022

(51) Int. Cl.
| | | |
|---|---|---|
| *B03D 1/02* | (2006.01) | |
| *B02C 23/18* | (2006.01) | |
| *B03D 1/08* | (2006.01) | |
| *C02F 1/28* | (2006.01) | |
| *B02C 19/00* | (2006.01) | |
| *B09C 1/02* | (2006.01) | |

(52) U.S. Cl.
CPC .............. *B03D 1/02* (2013.01); *B02C 19/005* (2013.01); *B02C 23/18* (2013.01); *B03D 1/087* (2013.01); *B09C 1/02* (2013.01); *C02F 1/28* (2013.01)

(58) Field of Classification Search
CPC .......... B03D 1/02; B03D 1/087; B03D 1/006; B03D 1/014; B03D 1/01; B03D 1/08;
(Continued)

(56) References Cited

U.S. PATENT DOCUMENTS

| | | | | | |
|---|---|---|---|---|---|
| 2,174,553 | A | * | 10/1939 | Arthurc | ..................... B03B 5/02 122/31.1 |
| 4,923,125 | A | * | 5/1990 | Bateson | ..................... B03B 9/00 209/164 |

(Continued)

FOREIGN PATENT DOCUMENTS

| | | |
|---|---|---|
| JP | 2002045840 A | 2/2002 |
| JP | 2007326073 A | 12/2007 |

(Continued)

OTHER PUBLICATIONS

Shimizu Corporation, "Soil Washing Pilot Test Evaluation", Dioxin Remediation at Bien Hoa Airbase Area Project, Dec. 19, 2019.

*Primary Examiner* — Joseph W Drodge
(74) *Attorney, Agent, or Firm* — Hoffmann and Baron, LLP

(57) ABSTRACT

A washing treatment system for contaminated soil, including: a classifier that is configured to obtain a sand fraction having a particle size within a predetermined range and a fine-grained fraction having a particle size smaller than the predetermined range, from contaminated soil containing one or more contaminants selected from dioxins and agricultural chemicals; a detaching/washing unit that is configured to detach a contaminant particle containing the from a surface of the sand fraction; a removal unit that is configured to generate air bubbles in a presence of water containing a flotation chemical, allows the detached contaminant-bearing particles to attach to the air bubbles to form froth, and removes the froth to obtain a first slurry containing primary purified soil; and an up-flow washing unit that is provided downstream of the removal unit, and is configured to supply the first slurry into up-flow water to purify the primary purified soil.

14 Claims, 4 Drawing Sheets

(58) Field of Classification Search
CPC ........ B03D 1/082; B03D 1/14; B03D 1/1431;
B03D 1/145; B03D 101/00; B03D
101/02; B03D 103/00; B02C 19/005;
B02C 23/18; B02C 19/00; B02C 19/006;
B02C 23/36; B09C 1/02; B09C 1/00;
B09C 1/08; C02F 1/28; C02F 1/24; C02F
1/58; C02F 11/00; C02F 11/004; C02F
11/12; C02F 11/121; C02F 11/127; C02F
11/14; C02F 2101/30; C02F 2101/34;
B08B 3/04; B08B 3/044; B08B 3/10;
B01D 11/02; B01D 11/028; B01D 21/00;
B01D 21/0027; B01D 21/01; B01D
21/04; B01D 21/06; B01D 21/26; B01D
21/267

See application file for complete search history.

(56) References Cited

U.S. PATENT DOCUMENTS

| | | | | |
|---|---|---|---|---|
| 5,055,196 A | * | 10/1991 | Darian | B09C 1/02 210/638 |
| 5,114,568 A | * | 5/1992 | Brinsmead | B03D 1/16 209/170 |
| 5,115,986 A | * | 5/1992 | Bateson | B03B 9/00 241/20 |
| 5,266,494 A | * | 11/1993 | Lahoda | B09C 1/02 134/10 |
| 5,303,871 A | * | 4/1994 | Bateson | B03B 9/00 241/20 |
| 5,453,133 A | * | 9/1995 | Sparks | B09C 1/02 134/10 |
| 6,527,960 B1 | * | 3/2003 | Bacon | B01D 17/0214 210/741 |
| 2004/0082828 A1 | * | 4/2004 | Bergeron | B03B 9/00 588/310 |
| 2006/0140725 A1 | * | 6/2006 | Benjamin | B09C 1/00 405/128.7 |
| 2017/0056942 A1 | * | 3/2017 | Stoin | B09C 1/02 |
| 2017/0113952 A1 | * | 4/2017 | Stephenson | B01D 21/00 |
| 2017/0333961 A1 | | 11/2017 | Song et al. | |
| 2017/0370217 A1 | * | 12/2017 | Hazen | E21C 41/32 |
| 2018/0339299 A1 | * | 11/2018 | Pratt | B09C 1/00 |

FOREIGN PATENT DOCUMENTS

| | | |
|---|---|---|
| JP | 2019150774 A | 9/2019 |
| JP | 2019181403 A | 10/2019 |

* cited by examiner

WASHING TREATMENT SYSTEM AND WASHING TREATMENT METHOD FOR CONTAMINATED SOIL This application claims priority from International Application No. PCT/JP2020/026025, filed on Jul. 2, 2020, which is incorporated herein in its entirety.

TECHNICAL FIELD

This invention relates to a washing treatment system and a washing treatment method for contaminated soil.

BACKGROUND OF THE INVENTION

Dioxins are non-volatile stable organochlorine compounds. Agricultural chemicals contain various organic compounds. Dioxins and agricultural chemicals raise concerns regarding their harmful influence on human bodies. Therefore, remediation system have been required to decontaminate soils contaminated with one or more contaminants selected from dioxins and agricultural chemicals.

For example, Japanese Unexamined Patent Application, First Publication No. 2019-150774 proposes a washing treatment system for dioxin-contaminated soil, the system including a classifier, a detaching/washing unit, and a removal unit. Japanese Unexamined Patent Application, First Publication No. 2019-181403 proposes a washing treatment system for agricultural chemical-contaminated soil, the system including a classifier, a detaching/washing unit, a removal unit, and a water treatment unit.

However, there is a concern that the techniques of Japanese Unexamined Patent Application, First Publication No. 2019-150774 and Japanese Unexamined Patent Application, First Publication No. 2019-181403 cannot allow sufficient removal of contaminants in soil depending on type of the contaminated soil.

Therefore, the objective of this invention is to provide a washing treatment system and a washing treatment method that can more surely remove the contaminants from the contaminated soil.

SUMMARY OF THE INVENTION

In order to solve the above problems, this invention has the following means.

[1] A washing treatment system for contaminated soil, including:
a classifier that is configured to obtain a sand fraction having a particle size within a predetermined range and a fine-grained fraction having a particle size smaller than the predetermined range, from contaminated soil containing one or more contaminants selected from dioxins and agricultural chemicals;
a detaching unit (which is, hereinbelow, also referred to as a detaching/washing unit) that is configured to detach contaminant-bearing particles containing the contaminant from a surface of the sand fraction;
a removal unit that is configured to generate air bubbles in a presence of water containing a flotation chemical, allow the detached contaminant-bearing particles to attach to the air bubbles to form froth, and removes the froth to obtain a first slurry containing primary purified soil; and
an up-flow washing unit that is provided downstream of the removal unit and is configured to supply the first slurry into up-flow water to purify the primary purified soil.

[2] The washing treatment system for contaminated soil according to [1],
in which the detaching/washing unit is a scrubber having a stirring tank and a stirring blade.

[3] The washing treatment system for contaminated soil according to [1] or [2], further including:
a water treatment unit that is configured to bring the contaminant dissolved in a second slurry containing the fine-grained fraction and the froth into contact with an adsorbent to obtain purified water.

[4] A washing treatment method for contaminated soil, including:
a classification step of obtaining a sand fraction having a particle size within a predetermined range and a fine-grained fraction having a particle size smaller than the predetermined range, from contaminated soil containing one or more contaminants selected from dioxins and agricultural chemicals;
a detaching step (which is, hereinbelow, also referred to as a detaching/washing step) of detaching contaminant-bearing particles containing the contaminant from a surface of the sand fraction;
a removal step of generating air bubbles in a presence of water containing a flotation chemical, allowing the detached contaminant-bearing particles to attach to the air bubbles to form froth, and removing the froth to obtain a first slurry containing primary purified soil; and
an up-flow washing step, as a step subsequent to the removal step, of supplying the first slurry into up-flow water to purify the primary purified soil.

[5] The washing treatment method for contaminated soil according to [4],
in which the detaching/washing step includes an operation of scrubbing particles of the sand fraction together by using a scrubber having a stirring tank and a stirring blade.

[6] The washing treatment method for contaminated soil according to [4] or [5], further including:
a water treatment step of bringing the contaminant dissolved in a second slurry containing the fine-grained fraction and the froth into contact with an adsorbent to obtain purified water.

[7] The washing treatment method for contaminated soil according to any one of [4] to [6],
in which the flotation chemical is a chemical reagent that does not allow dissolution of the contaminant in water.

The washing treatment system and method of this invention can more surely remove the contaminants from the contaminated soil.

DETAILED DESCRIPTION OF THE INVENTION

The washing treatment system for contaminated soil (hereinafter, simply referred to as a washing treatment system) washes the contaminated soil by classifying the contaminated soil containing one or more contaminants selected from dioxins and agricultural chemicals, subjecting a specific fraction resulting from the classification to detaching/washing, and removing the contaminant from the specific fraction.

This invention's washing treatment system includes a classifier, a detaching/washing unit, a removal unit, and an up-flow washing unit.

Hereinafter, a first embodiment of the washing treatment system of this invention will be described with reference to FIG. 1.

First Embodiment

<<Washing Treatment System>>

Figure 1:
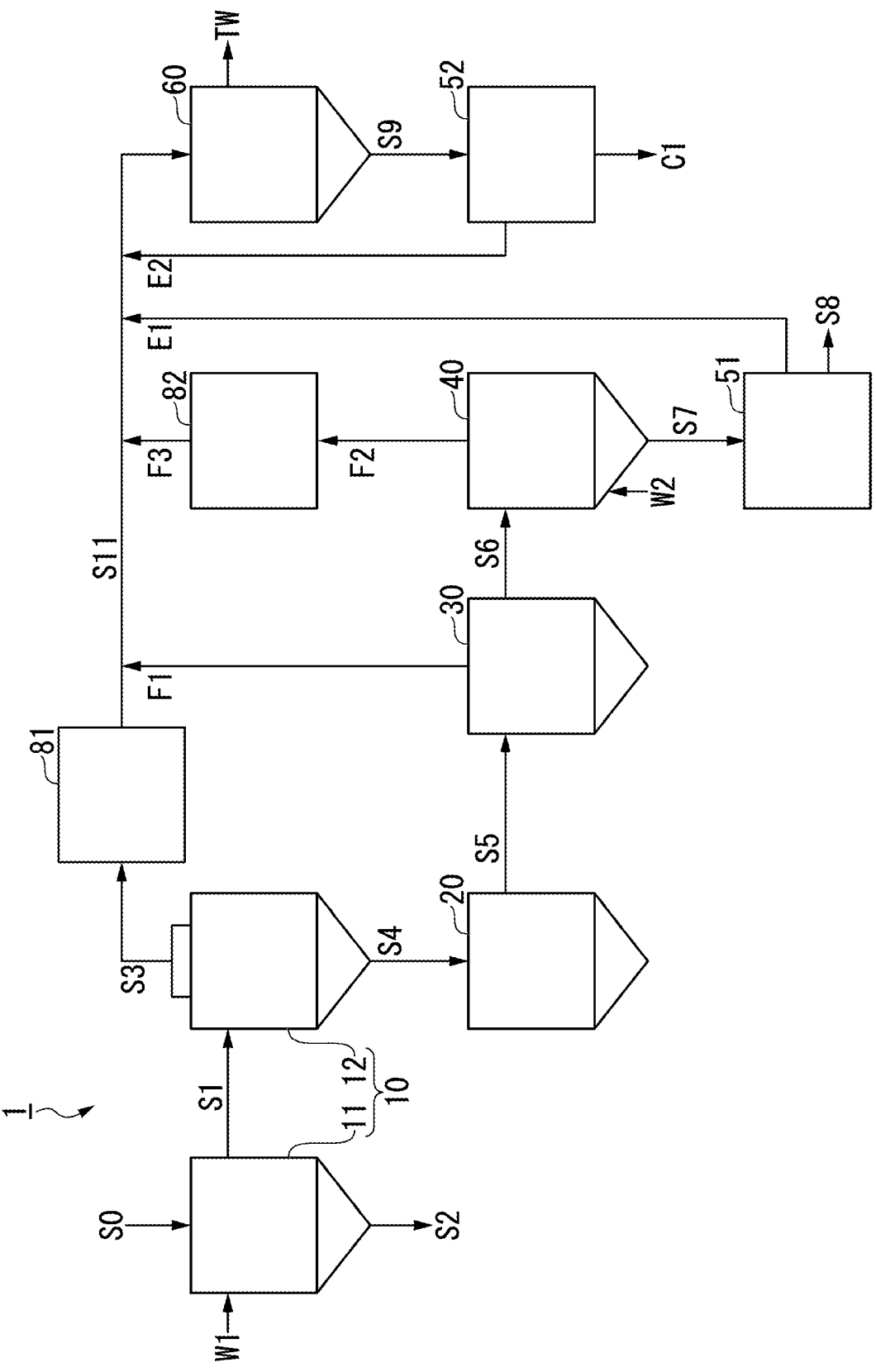
FIG. 1 is a schematic diagram showing an example of a washing treatment system for contaminated soil according to a first embodiment of this invention.

As shown in FIG. 1, the washing treatment system 1 of this embodiment includes a classifier 10, a detaching/washing unit 20, a removal unit 30, an up-flow washing unit 40, a first dewatering unit 51, a second dewatering unit 52, a coagulation/flocculation sedimentation unit 60, a first separation unit 81, and a second separation unit 82. The classifier 10 includes a first classifier 11 and a second classifier 12.

The second classifier 12 is provided on a secondary side of the first classifier 11.

The detaching/washing unit 20 and the first separation unit 81 are provided on a secondary side of the second classifier 12.

The removal unit 30 is provided on a secondary side of the detaching/washing unit 20.

The up-flow washing unit 40 is provided on a secondary side of the removal unit 30.

The first dewatering unit 51 and the second separation unit 82 are provided on a secondary side of the up-flow washing unit 40.

The coagulation/flocculation sedimentation unit 60 is provided on a secondary side of the removal unit 30, the first dewatering unit 51, the first separation unit 81, and the second separation unit 82.

The second dewatering unit 52 is provided on a secondary side of the coagulation/sedimentation unit 60.

The first classifier 11 is a unit that classifies contaminated soil S0 containing one or more contaminants selected from dioxins and agricultural chemicals (hereinafter, simply referred to as contaminated soil) into a coarse-grained fraction S2 having a particle size larger than a predetermined particle size and soil S1 free of the coarse-grained fraction S2 (hereinafter, simply referred to as soil S1). The particle size of the soil S1 is smaller than the particle size of the coarse-grained fraction S2.

As the first classifier 11, a known classifier can be used. Examples of the first classifier 11 include a circular vibrating screen including a metallic mesh screen with a predetermined opening, and a vibrating wet screen including a two-stage wet screen. The two-stage wet screen is a screen including metallic mesh screens with respective predetermined openings, which are respectively provided in two stages, i.e., an upper stage and a lower stage. The predetermined opening of the screen of the upper stage is, for example, 20 to 50 mm. The predetermined opening of the screen of the lower stage is, for example, 1 to 4 mm.

The predetermined opening of the screen of the lower stage is appropriately set according to the particle size of the coarse-grained fraction S2 to be removed.

In this specification, the "particle size" refers to a representative particle size of soil particles constituting the soil. The representative particle size $D_M$ is determined by the following Formula (I), using particle sizes of soil particles classified by a screen having screen openings $D_L$ and $D_U$. For example, regarding the representative particle size $D_M$ of soil particles that pass through a screen having 38 μm screen openings, $D_M$=26.9 μm is obtained from $D_L$=0 μm and $D_U$=38 μm.

[Mathematical Formula 1]

$$D_M = \sqrt{(D_L^2 + D_U^2)/2} \qquad (I)$$

The term "dioxins" as used herein is a generic term for polychlorinated dibenzoparadioxins (PCDDs), polychlorinated dibenzofurans (PCDFs), and dioxin-like polychlorinated biphenyls (DL-PCBs). The DL-PCBs refer to polychlorinated biphenyls (PCBs) having a specific toxicity of dioxins. The toxicity of dioxins is expressed in terms of an equivalent amount of toxicity (TEQ), based on a toxicity of 2,3,7,8-tetrachlorodibenzo-1,4-dioxin (TCDD).

The term "agricultural chemicals" refers to: fungicides, insecticides, and other chemicals which are used for controlling fungi, nematodes, insects, rats, other animals and plants, or viruses that harm agricultural products and the like; and plant growth regulators, germination inhibitors, and other chemicals which are used for enhancing or suppressing physiological functions of agricultural products and the like. Examples of the agricultural chemicals include insecticides, fungicides, insecticidal fungicides, herbicides, rodenticides, plant growth regulators, attractants, spreading agents, and microbial agents.

Examples of a chemical substance contained in the agricultural chemicals, that is, examples of the contaminant include 2,4-dichlorophenoxyacetic acid (2,4-D), 2,4,5-trichlorophenoxyacetic acid (2,4,5-T), 3,6-dichloro-2-methoxybenzoic acid (dicamba), 1,2,3,4,5,6-hexachlorocyclohexane (benzene hexachloride, BHC, HCH), aldrin, dieldrin, endrin, chlorden, heptachlor, and dichlorodiphenyl-trichloroethane (DDT).

Examples of the agricultural chemicals as a target for the treatment in this specification include 2,4-D, 2,4,5-T, and BHC, which have high solubility in water as an agricultural chemical and cannot be treated by coagulation/flocculation sedimentation treatment.

Regarding the solubility of the agricultural chemical in water, the 2,4-D is 238 mg/L (30° C.), the 2,4,5-T is 900 mg/L (25° C.), and the BHC is 7.3 mg/L (25° C.). Some of these agricultural chemicals dissolved in water are present in a dissolved state in water.

The dioxins also slightly dissolve in water, and the solubility of 2,3,7,8-TCDD is $1.93 \times 10^{-5}$ mg/L (25° C.).

By the first classifier 11 can separate the coarse-grained fraction S2 having a predetermined particle size from the contaminated soil S0.

The second classifier 12 is a unit that classifies the soil S1 into a fine-grained fraction S3 having a particle size (classification diameter) smaller than a predetermined particle size and a sand fraction S4 having a particle size (classification diameter) not smaller than the predetermined particle size.

As the second classifier 12, a known classifier can be used. Examples of the second classifier 12 include a circular vibrating screen including a metallic mesh screen with a predetermined opening, a vibrating wet screen including a two-stage wet screen, a classifier exploiting difference in settling velocity of soil particles, and a centrifugal separator. Examples of the classifier exploiting difference in settling velocity of soil particles include an Akins classifier and a high mesh separator. Examples of the centrifugal separator include a hydrocyclone.

The centrifugal separator is a unit that classifies a slurry in which the soil S1 and water W1 are mixed, by using the centrifugal force. Examples of the centrifugal separator include a unit including an upper inlet for introducing a slurry, a lower outlet for taking out an underflow (hereinafter, also referred to as UF), and an upper outlet for taking out an overflow (hereinafter, also referred to as OF), in which a columnar bottom part is in the form of a conical container.

In this specification, the "classification diameter" is also referred to as the D50 cut point, and means a particle size of soil particles, which is a classification threshold separating the OF and the UF.

The predetermined particle size is, for example, preferably 30 to 250 μm, and more preferably 50 to 100 μm.

By the second classifier 12, the sand fraction S4 having a particle size within a predetermined range can be obtained from the contaminated soil S0. The predetermined range of the particle size is, for example, from 30 to 4000 μm.

The first separation unit 81 is a unit that separates and removes an organic substance or contaminant-bearing particles having a particle size larger than a predetermined particle size, from the fine-grained fraction S3 classified by the second classifier 12. Examples of the first separation unit 81 include a separation unit including a mesh with a predetermined opening. Example of such a separation unit includes an overflow dewatering table (OF dewatering table) including a rotatable mesh belt and a scraping portion. The predetermined opening of the mesh is, for example, 50 to 150 μm.

By the first separation unit 81, a fine-grained fraction S11 is obtained by removing the organic substance and the contaminant-bearing particles having a particle size larger than the predetermined range from the fine-grained fraction S3. The predetermined particle size is, for example, 50 to 150 μm.

The detaching/washing unit 20 is a unit that applies a shearing force to the sand fraction S4 to detach the contaminant-bearing particles containing a contaminant (hereinafter, also referred to as a "contaminant phase") from the surface of the sand fraction S4.

Examples of the detaching/washing unit 20 include a washing unit including a washing tank, a stirring unit including a stirrer, and a scrubber including a stirring tank and a stirring blade. In this specification, the term "scrubber" refers to a unit that includes a stirring tank and a stirring blade, and can scrub the soil particles against each other by mechanically mixing and stirring using the stirring blade, in the presence of water. By the scrubber, it is possible to detach the contaminant phase attached to a surface, by scrubbing surfaces of the soil particles by causing the soil particles (sand fraction S4) to collide with each other. Therefore, it is preferable to use the scrubber as the detaching/washing unit 20.

By the detaching/washing unit 20, it is possible to detach the contaminant phase from the surface of the sand fraction S4. That is, the detaching/washing unit 20 can detach and liberate the contaminant from the surface of the sand fraction S4.

The removal unit 30 is a removal unit that generates air bubbles in the presence of water containing a flotation chemical, allows the contaminant phase to attach to the air bubbles to form froth (foam) F1, and removes the froth F1.

Example of the removal unit 30 includes a flotation unit including a water tank and a scraper. The scraper scrapes and removes the froth (foam) F1 floating on a liquid surface of a liquid containing a sand fraction S5 and the water W1 in the water tank. The flotation unit may be a unit that removes the froth F1 by causing the froth F1 to overflow by supplying the water W1. By the flotation unit, the contaminant phase detached by the detaching/washing unit 20 can be efficiently removed. Therefore, a flotation unit is preferable as the removal unit 30.

From a viewpoint of facilitating a water treatment, the flotation chemical is preferably a chemical reagent that does not allow dissolution of the contaminant in water. By preventing the contaminant from dissolving in water, the contaminant phase is be allowed to attach to a larger amount of air bubbles, thereby further increasing the removal efficiency. In addition, the amount of the contaminants dissolved in water can be reduced, allowing significant reduction of the amount of the adsorbent to be used for removing the contaminants dissolved in water.

The flotation chemical includes a collector.

The collector is a chemical reagent that adsorbs on the surface of a target contaminant phase to make a particle surface of the contaminant-bearing particles hydrophobic. Examples of the collector include fatty acid salt, alkyl sulfate, alkyl sulfonate, dialkyldithiophosphate, xanthate, primary amine salt, light oil, kerosene, and coal tar. One kind of the collector may be used alone, or two or more kinds thereof may be used in combination. The fatty acid salt, the alkyl sulfate, the alkyl sulfonate (so-called anionic surfactants), primary amine salt (so-called cationic surfactants), light oils, and kerosene also function as a release dispersant, in the detaching/washing step to be described later. Further, in this specification, the term "surfactant" refers to a compound which has a hydrophilic group and a hydrophobic group, and is not used for the purpose of solubilizing the contaminant in water.

The flotation chemical may include a frother, a release dispersant, an activator, a depressant, and a pH adjuster.

The frother is a surfactant that has high surface activity and does not have a specific adsorption property. The frother generates a large amount of stable air bubbles in water. Examples of the frother include 4-methyl-2-pentanol (MIBC), pine oil, and 2-ethyl-1-hexanol. One kind of the frother may be used alone or two or more kinds thereof may be used in combination.

The release dispersant used for the flotation chemical is a chemical reagent that detach and disperses the contaminant phase from the surface of the sand fraction S4. Examples of the release dispersant used for the flotation chemical include alcohols, an anionic surfactant (excluding fatty acid salts, alkyl sulfates, and alkyl sulfonates), and a cationic surfactant (excluding primary amine salts), calcium chloride, sodium carbonate, sodium silicate, and lignin sulfonate. Examples of the alcohols include monoalcohol such as ethanol. One kind of the release dispersant used for the flotation chemical may be used alone or two or more kinds thereof used in combination.

Activators are chemical reagents that increase the floatability of the target contaminant phase. A low affinity between the surface of the contaminant phase and the collector results in a low floatability of the contaminant phase. The activator acts on the surface of the contaminant phase to increase the affinity with the collector and serves to enhance the floatability of the contaminant phase. Examples of the activator include copper sulfate, calcium chloride, and sodium sulfide. One kind of the activator may be used alone or two or more kinds thereof may be used in combination.

Depressants are chemical reagents that depress the floatability of minerals. Examples of the depressant include sodium sulfide, sodium carbonate, sodium hydroxide, sodium silicate, tannin, and lignin. One kind of the depressant may be used alone or two or more kinds thereof may be used in combination.

The pH adjuster is a chemical reagent that adjusts a pH of the liquid containing the sand fraction S5 from which the contaminant phase has been detached and the water W1. Examples of the pH adjuster include sulfuric acid, sodium hydroxide, calcium hydroxide, and carbon dioxide gas. One kind of the pH adjuster may be used alone or two or more kinds thereof may be used in combination.

By the removal unit 30, the detached contaminant phase can be removed as the froth F1. As a result, first slurry S6 containing the primary purified soil is obtained.

The up-flow washing unit 40 is a unit that is provided downstream of the removal unit 30, and supplies the first slurry S6 into up-flow water to purify the primary purified soil.

Examples of the up-flow washing unit 40 include a gravity sorting unit that generates up-flow by supplying up-flow water W2, and is capable of separating large or small organic substances or contaminant-bearing particles in soil, exploiting difference in settling velocity of particles in the first slurry S6. Examples of such a gravity sorting unit is an up-flow column.

In the up-flow column, the up-flow from the bottom places the sand particles of the first slurry S6 in a layer expansion state. The organic substances or the contaminant-bearing particles whose settling velocity is lower than up-flow velocity are allowed to float and flow out together with water, as an overflow F2. The overflow F2 is sent to the second separation unit 82. The sand particles deposited on the bottom are discharged from an outlet. Since the organic substances or contaminant-bearing particles containing the contaminant are removed as the overflow F2, the primary purified soil is further purified to obtain secondary purified soil S7.

By the up-flow washing unit 40, the primary purified soil is further purified to obtain the secondary purified soil S7.

The second separation unit 82 is a unit that separates and removes an organic substance or contaminant-bearing particle having a particle size larger than a predetermined range, from the overflow F2. Examples of the second separation unit 82 include a separation unit equivalent to the first separation unit 81.

The amount of water in the overflow F2 is smaller than the amount of water in the fine-grained fraction S3. Therefore, it is preferable that a table area of the second separation unit 82 (area of a mesh belt) is smaller than a table area of the first separation unit 81.

The predetermined opening of the mesh in the second separation unit 82 is, for example, 50 to 150 μm. The predetermined opening of the mesh in the second separation unit 82 may be the same as or different from the predetermined opening of the mesh in the first separation unit 81.

By the second separation unit 82, an overflow F3 is obtained by removing the organic substance or the contaminant-bearing particle having a particle size larger than a predetermined range from the overflow F2. The predetermined particle size is, for example, 50 to 150 μm.

The coagulation/flocculation sedimentation unit 60 is a unit that adds a coagulant/flocculant to an aqueous suspension containing the fine-grained fraction S11, the froth F1, and the overflow F3, stirs the resulting mixture, and allows the fine-grained fraction S11 in the aqueous suspension, fine contaminant particles attached to the froth F1, and the organic substance and the contaminant particle in the overflow F3 discharged from the up-flow washing unit 40 to settle as a large floc S9, thereby separating clear purified water TW. The aqueous suspension contains the fine-grained fraction S11 separated by the second classifier 12 and the first separation unit 81, the fine contaminant particles attached to the froth F1 removed by the removal unit 30, the organic substance and the contaminant particle in the overflow F3 which has been discharged from the up-flow washing unit 40 and has passed through the second separation unit 82, and dewatering-treatment water E1 removed by the first dewatering unit 51.

Examples of the coagulation/flocculation sedimentation unit 60 include a container including a water tank, a reaction column, an up-flow type floc separation tank, an inclined plate sedimentation tank (thickener), and a unit combining these.

By the coagulation/flocculation sedimentation unit 60 can separate the purified water TW and the sedimentation sludge S9. The purified water TW is transferred to and stored in a water storage tank (not shown).

The first dewatering unit 51 is a unit that dewaters the secondary purified soil S7 obtained by the up-flow washing unit 40 to obtain washed sand S8.

Examples of the first dewatering unit 51 include a dewatering screen and a dewatering hydrocyclone.

By the first dewatering unit 51, the washed sand S8 is obtained by removing water from the secondary purified soil S7.

The second dewatering unit 52 is a unit that dewaters the sedimentation sludge S9 obtained by the coagulation/flocculation sedimentation unit 60 to obtain a concentrated residue C1.

The concentrated residue C1 contains a contaminant at a high concentration. Examples of the concentrated residue C1 include a dewatered cake.

Examples of the second dewatering unit 52 include a pressure filtration unit (filter press) including a filter made of a filter fabric and the like and a press machine.

<<Washing Treatment Method for Contaminated Soil>>

This invention's washing treatment method for contaminated soil (hereinafter, simply referred to as a washing treatment method) is a method that detaches and removes the contaminant-bearing particle containing the contaminant (hereinafter, also referred to as a "contaminant phase" which is exemplified by a fine-grained fraction, inorganic particles attached to the sand fraction, organic substances, and the like) from the contaminated soil containing one or more contaminants selected from dioxins and agricultural chemicals, to thereby carry out the washing treatment of the contaminated soil.

The washing treatment method of this invention includes a classification step, a detaching/washing step, a removal step, and an up-flow washing step.

Figure 2:
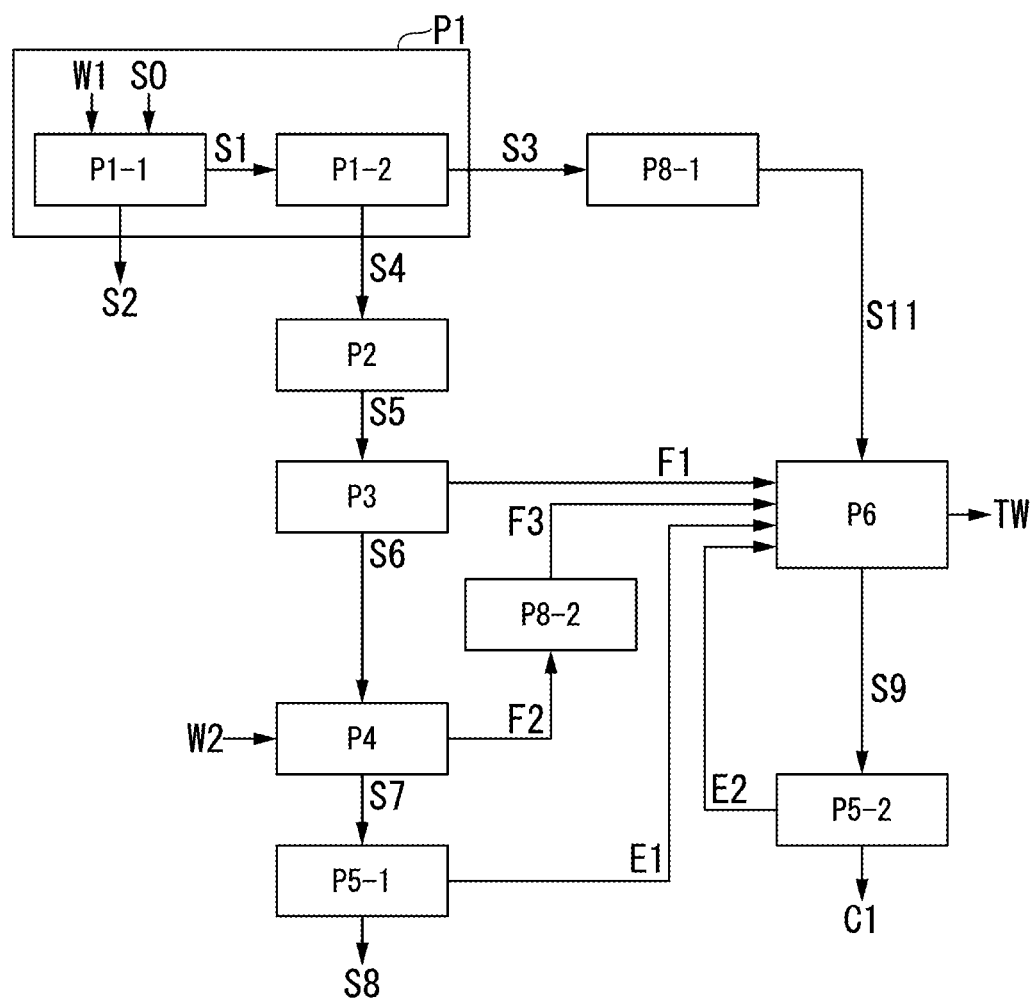
FIG. 2 is a flowchart showing an example of a washing treatment method for contaminated soil according to a first embodiment of this invention.

Hereinafter, a first embodiment of the washing treatment method of this invention will be described with reference to FIGS. 1 and 2.

<Classification Step>

The classification step P1 is a step of obtaining the sand fraction S4 having a particle size within a predetermined range and the fine-grained fraction S3 having a particle size smaller than the predetermined range, from the contaminated soil S0 containing one or more contaminants selected from dioxins and agricultural chemicals. In this embodiment, the classification step P1 includes a first classification step P1-1 and a second classification step P1-2.

The first classification step P1-1 is a step of separating the contaminated soil into the soil S1 having a particle size not larger than a predetermined particle size and the coarse-grained fraction S2 having a particle size larger than the predetermined range.

The predetermined particle size is appropriately set according to the degree of contamination of the contaminated soil S0, an allowable size of the second classifier 12, and the like. The predetermined particle size is, for example, 1 to 4 mm, and particularly preferably 2 mm.

The one or more contaminants selected from dioxins and agricultural chemicals are difficult to be adsorbed by the coarse-grained fraction S2 having a predetermined particle size larger than the predetermined range. Therefore, when the coarse-grained fraction S2 has been removed from the contaminated soil S0 in advance, it is easy to improve washing efficiency of the contaminated soil S0. In this context, the predetermined particle size is, for example, 1 to 4 mm, and particularly preferably 2 mm. In addition, when the coarse-grained fraction S2 has been removed from the contaminated soil S0 in advance, it is easy to reduce load on the second classifier 12.

Accordingly, it is preferable that the classification step P1 includes the first classification step P1-1 and the second classification step P1-2.

In the first classification step P1-1, first, the water W1 is added to the contaminated soil S0 put in the first classifier 11 to form a slurry. Next, the contaminated soil S0 is screened into the soil S1 having a particle size not larger than a predetermined particle size and the coarse-grained fraction S2 having a particle size larger than the predetermined particle size.

In general, a contaminant concentration of the coarse-grained fraction S2 is low and is not higher than the soil environmental criteria. The coarse-grained fraction S2 having the contaminant concentration exceeding the soil environmental criteria is washed and processed by a gravel washing unit (not shown) such as a log washer. In this manner, the coarse-grained fraction S2 can be reused.

In general, the smaller the particle size of the soil, the higher the contaminant concentration. Therefore, the soil S1 has a higher contaminant concentration than that of the coarse-grained fraction S2. The soil S1 is sent to the second classifier 12.

The second classification step P1-2 is a step that separates the soil S1 into the fine-grained fraction S3 having a particle size (classification diameter) smaller than a predetermined particle size and the sand fraction S4 having a particle size (classification diameter) not smaller than the predetermined particle size.

In general, the contaminant concentration of the fine-grained fraction S3 is high, whereas the contaminant concentration of the sand fraction S4 is low. By separating the fine-grained fraction S3, the contaminant concentration of the recovered sand fraction S4 is significantly reduced.

The predetermined particle size is, for example, preferably 30 to 250 μm, and more preferably 50 to 100 μm.

In the second classification step P1-2, the second classifier 12 classifies the soil S1 into an OF containing the fine-grained fraction S3 and a UF containing the sand fraction S4. In the second classification step P1-2, the water W1 may be supplied to the second classifier 12 from the outside.

In a case where the hydrocyclone is used as the second classifier 12, the slurry-like soil S1 that has entered from an upper inlet is supplied at high speed in a circumferential direction of a cylindrical container and is classified by a centrifugal action generated by the rotary motion. In this case, particles having large particle sizes or particles having large specific gravities in the slurry are collected on a peripheral wall by a centrifugal force, and are gradually driven toward and discharged from a UF outlet (lower outlet). Particles having small particle sizes or particles having low specific gravities go up forming a vortex in a central portion of a cylindrical container, and are discharged from an OF outlet (upper outlet).

The predetermined particle size range can be adjusted by the flow rate and supply pressure of the slurry-like soil S1 when the hydrocyclone is driven, the outlet size of the hydrocyclone, and the like.

The UF containing the sand fraction S4 is sent to the detaching/washing unit 20. The OF containing the fine-grained fraction S3 is sent to the first separation unit 81.

<Detaching/Washing Step>

The detaching/washing step P2 is a step of applying a shearing force to the sand fraction S4 to detach the contaminant phase from the surface of the sand fraction S4.

The sand fraction S4 in the UF is surface-treated by the release dispersant in the detaching/washing unit 20. This surface treatment facilitates chemical detachment of the contaminant phase from the surface of the sand fraction S4.

Examples of the release dispersant include alcohols, anionic surfactants, cationic surfactants, light oils, kerosene, calcium chloride, sodium carbonate, sodium silicate, and lignin sulfonate. One kind of the release dispersant may be used alone or two or more kinds thereof may be used in combination.

Next, the contaminant phase is physically detached from the surface of the sand fraction S4, by applying the shearing force to the sand fraction S4. Examples of a method for applying the shearing force to the sand fraction S4 include scrubbing (rubbing by stirring).

The detaching/washing step P2 is preferable to include an operation of scrubbing particles of the sand fraction S4 against each other by using the scrubber including the stirring tank and the stirring blade. This operation in the detaching/washing step P2 enables the contaminant phase to be detached more effectively from the surface of the sand fraction S4.

The time required for the detaching/washing step P2 is preferably 2 to 10 minutes, and more preferably 4 to 6 minutes. When the time required for the detaching/washing step P2 is not less than the lower limit, the contaminant phase can be easily sufficiently detached from the surface of the sand fraction S4. When the time required for the detaching/washing step P2 is not more than the upper limit, it is easy to improve work efficiency.

The kind, amount added, pH, and the like of the release dispersant used in the detaching/washing step P2 can be appropriately adjusted according to the concentration, morphology, and the like of the contaminant adsorbed on the sand fraction S4.

The UF containing the sand fraction S5 from which the contaminant phase has been detached is sent to the removal unit 30.

<Removal Step>

A removal step P3 is a step of generating air bubbles in the presence of water containing a flotation chemical, allowing the detached contaminant phase to attach to the air bubbles to form froth F1, and removing the froth F1 to obtain the first slurry S6 containing the primary purified soil.

In the removal step P3, the slurry containing the sand fraction S5 is supplied to the water tank (flotation cell) of the removal unit 30. In the removal step P3, a frother is added as the flotation chemical and flotation is performed. The flotation introduces a predetermined amount of air into the water tank of the removal unit 30. The introduced air is rapidly stirred by the stirring blade of the removal unit 30, and air bubbles of a predetermined size are generated in the process. The flotation chemical (collector) acts to allow the contaminant phase detached in the detaching/washing step P2 to attach to the air bubbles.

The conditions that enable the generation of desirable froth F1 vary depending on the kind of the contaminant, the kind of the flotation chemical, the rotation speed of the stirring blade, the amount of air introduced, and the like. The rotation speed of the stirring blade is preferably adjusted so that the sand fraction S5 does not settle on the bottom of the removal unit 30 and flows within a range without rising to a liquid surface. The flow rate of the supplied air is preferably adjusted so that the froth F1 having a desirable size is formed. In this step, by using the flotation chemical that does not allow dissolution of the contaminant in water, the contaminant phase is allowed to attach to a larger amount of air bubbles, and a removal efficiency is further increased. In addition, the amount of the contaminants dissolved in water can be reduced, allowing significant reduction of the amount of the adsorbent to be used for removing the contaminants solubilized in water.

The air bubbles to which the contaminant phase has been attached, rise to the liquid surface as the froth F1, are collected by the scraper of the removal unit 30, and are removed to the outside of the system of the removal unit 30. In the removal step P3, the water W1 may be supplied to the removal unit 30 from the outside. The froth F1 may be removed by causing the froth F1 to overflow by supplying the water W1.

The time required for the removal step P3 is preferably 5 to 20 minutes, and more preferably 10 to 15 minutes. When the time required for the removal step P3 is not less than the lower limit, it is easy to remove the froth F1 sufficiently. When the time required for the removal step P3 is not more than the upper limit, it is easy to improve work efficiency.

The kind, the amount added, the pH, and the like of the flotation chemical used in the removal step P3 can be appropriately adjusted depending on the contaminant concentration in the slurry containing the sand fraction S5, the slurry concentration, the slurry flow rate, the residence time of the slurry, and the like.

In the removal step P3, the contaminant phase is selectively separated by exploiting difference in surface chemical properties between the contaminant phrase and the soil particles without adsorbed contaminant, and the separated contaminant phase is allowed to rise to the liquid surface together with the air bubbles and removed as the froth F1.

The first slurry S6 containing the washed primary purified soil from which the contaminant phase has been removed is sent to the up-flow washing unit 40.

The fine contaminant particles attached to the froth F1 are sent to the coagulation/flocculation sedimentation unit 60 together with the OF containing the fine-grained fraction S11.

The contaminant concentration of the primary purified soil which has been purified through the detaching/washing step P2 and the removal step P3 is further reduced as compared to the contaminant concentration of the sand fraction S4 after the classification step P1.

<Up-Flow Washing Step>

An up-flow washing step P4 is a step that is subsequent to the removal step P3 and supplies the first slurry S6 into up-flow water to purify the primary purified soil. The up-flow washing step P4 provided in this embodiment enables one or more contaminants selected from dioxins and agricultural chemicals to be more surely removed.

In the up-flow washing step P4, the up-flow is generated by supplying the up-flow water W2. The first slurry S6 is supplied into a column from a supply port provided in the up-flow washing unit 40. The up-flow water W2 is uniformly injected into the column from the injection port at the bottom of the up-flow washing unit 40 through the injection plate, and the injected up-flow water W2 is allowed to rise in the column and overflow at a predetermined height from the bottom. An up-flow velocity V is represented by a linear velocity (superficial velocity), and is a value obtained by dividing the sum of the up-flow water amount from the bottom and the water amount in the first slurry S6 by the cross-sectional area of the column. This up-flow velocity V places the sand particles of the first slurry S6 in a layer expansion state similar to backwashing of sand filtration.

Based on a principle that particles with a lower settling velocity than up-flow velocity V are allowed to float, the organic substances or the contaminant particles are separated and flow out as the overflow F2. The overflow F2 containing the organic substances and the contaminant particles separated in the up-flow washing step P4 flows into the second separation unit 82.

Particles with a higher settling velocity than the up-flow velocity V are allowed to settle and are deposited on the bottom of the up-flow washing unit 40. A valve is provided at a discharge port at the bottom, such that when the deposition of sand particles reaches or exceeds a certain amount, the deposition is automatically discharged. Since the organic substance or contaminant particle with adsorbed contaminant are removed as the overflow F2, the primary purified soil is further purified to obtain the secondary purified soil S7. In this embodiment, the secondary purified soil S7 may be a purified soil.

The up-flow velocity V can be adjusted according to the particle size or density of the sand particles in the first slurry S6, the particle size or density of the organic substances or contaminant particles to be removed, the shape or size of the up-flow washing unit 40, the layer expansion coefficient of the sand particles, and the like.

For example, when the particle size of the contaminant particle in the first slurry S6 is 40 to 60 μm, the up-flow washing unit 40 is a cylinder with a diameter of 1 to 5 m and a height of 2 to 6 m, and the first slurry S6 is discharged at 0.5 to 2 m from the bottom, the up-flow velocity V is preferably 3 to 5 m/hr. The up-flow velocity V can be appropriately adjusted according to the particle size or the density of the contaminant particles.

When the up-flow velocity V is not lower than the lower limit described above, the organic substance or contaminant particle with adsorbed contaminant can be sufficiently removed. When the up-flow velocity V is not higher than the upper limit, it is possible to suppress the reduction in the production amount of the secondary purified soil S7.

<Other Steps>

The washing treatment method of this embodiment may include other steps, in addition to the classification step P1, the detaching/washing step P2, the removal step P3, and the up-flow washing step P4. Examples of other steps include a first separation step P8-1, a second separation step P8-2, a first dewatering step P5-1, a second dewatering step P5-2, and a coagulation/flocculation sedimentation step P6.

The first separation step P8-1 is a step that separates and removes the organic substance or contaminant particle having a particle size larger than a predetermined particle size, from the fine-grained fraction S3 classified in the second classification step P1-2.

The organic substance or the contaminant particle that has a particle size larger than the predetermined particle size and is light is allowed to float easily, and thus, may not be successfully removed in the coagulation/flocculation sedimentation step P6 to be described later. Therefore, in the washing treatment method of this embodiment, it is preferable to remove the organic substance or the contaminant particle in advance in the first separation step P8-1. In this context, "light" means that a specific gravity is smaller than the water specific gravity of 1. Examples of the light organic substance include plant pieces, charcoal shells, and humus.

In the first separation step P8-1, for example, using an OF dewatering table, the organic substance or the contaminant particle that has a particle size larger than the predetermined particle size and is light is separated and removed. The OF dewatering table includes a mesh belt in which a mesh with a predetermined opening is rotatably provided, and a scraping unit for scraping off the organic substance or the contaminant particle that has been filtered out on a flat portion (dewatering table) on the mesh belt. From the OF containing the fine-grained fraction S3 sent to the OF dewatering table, the organic substance or the contaminant particle that has a particle size larger than the predetermined particle size and is light is filtered out on the dewatering table by a screen mesh of the mesh belt. These organic substances and the contaminant particles are scraped off and removed by the scraping unit such as a scraping rod. By the first separation step P8-1, the OF (OF containing the fine-grained fraction S11) obtained by removing the organic substance or the contaminant particle that has a particle size larger than the predetermined particle size and is light is obtained. The OF containing the fine-grained fraction S11 does not contain the organic substance or the contaminant particle that has a particle size larger than the predetermined particle size and is light, and therefore the removal efficiency in the coagulation/flocculation sedimentation step P6 is further increased. The organic substance or contaminant particle that has a particle size larger than the predetermined particle size and is light is transported to an incineration facility capable of decomposition treatment such as high heat treatment or a managed waste disposal site.

The predetermined opening of the mesh may be, for example, 50 to 150 μm, and more preferably 80 to 120 μm. The predetermined particle size may be, for example, 50 to 150 μm, and more preferably 80 to 120 μm.

The OF including the fine-grained fraction S11 contains the contaminant particles having a particle size not larger than a predetermined particle size, and is sent to the coagulation/flocculation sedimentation unit 60, together with the fine contaminant particles attached to the froth F1, the dewatering-treatment water E1 and the dewatering-treatment water E2.

The second separation step P8-2 is a step that separates and removes the organic substance or contaminant particle having a particle size larger than a predetermined particle size, from the overflow F2 flown out in the up-flow washing step P4.

The organic substance or contaminant particle that has a particle size larger than the predetermined particle size and is light is allowed to float easily, and thus, may not be successfully removed in the coagulation/flocculation sedimentation step P6 to be described later. Therefore, in the washing treatment method of this embodiment, it is preferable to remove the organic substance or the contaminant particle in advance in the second separation step P8-2.

In the second separation step P8-2, for example, using the OF dewatering table, the organic substance or contaminant particle that has a particle size larger than the predetermined particle size and is light is separated and removed. From the overflow F2 sent to the OF dewatering table, the organic substance or contaminant particle that has a particle size larger than the predetermined particle size and is light is filtered out on the dewatering table by a screen mesh of the mesh belt. These organic substances and the contaminant particles are scraped off and removed by the scraping unit such as a scraping rod. By the second separation step P8-2, the overflow F3 obtained by removing the organic substance or contaminant particle that has a particle size larger than the predetermined particle size and is light is obtained. The overflow F3 does not contain the organic substance or contaminant particle that has a particle size larger than the predetermined particle size and is light, and therefore, the removal efficiency in the coagulation/flocculation sedimentation step P6 is further increased. The organic substance or contaminant particle that has a particle size larger than the predetermined particle size and is light is transported to an incineration facility capable of decomposition treatment such as high heat treatment or a managed waste disposal site.

The predetermined opening of the mesh may be, for example, 50 to 150 μm, and more preferably 80 to 120 μm. The predetermined particle size may be, for example, 50 to 150 μm, and more preferably 80 to 120 μm.

The overflow F3 contains the contaminant particles having a particle size not larger than a predetermined particle size, and is sent to the coagulation/flocculation sedimentation unit 60, together with OF containing the fine-grained fraction S11, the fine contaminant particles attached to the froth F1, the dewatering-treatment water E1 and the dewatering-treatment water E2.

The first dewatering step P5-1 is a step of dewatering the secondary purified soil S7 to obtain the washed sand S8. In the first dewatering step P5-1, the secondary purified soil S7 is dewatered by the first dewatering unit 51 and collected as the washed sand S8. Since the washed sand S8 is obtained through the detaching/washing step P2, the removal step P3, and the up-flow washing step P4, the concentration of contaminants is sufficiently reduced. The washed sand S8 can be reused when the contaminant concentration is not higher than the soil environmental criteria. When the concentration exceeds the soil environmental criteria, the washing treatment is performed again. When the concentration of contaminants in the washed sand S8 exceeds the soil environmental criteria even after the second washing treatment, the washed sand is transported to an incineration facility capable of decomposition treatment such as high heat treatment or a managed waste disposal site and treated.

A water content separated by the dewatering is, as the dewatering-treatment water E1, sent to the coagulation/flocculation sedimentation unit 60, together with the OF containing the fine-grained fraction S11, the fine contaminant particles attached to the froth F1, and the overflow F3 which has been separated by the up-flow washing unit 40 and has passed through the second separation unit 82.

By the first dewatering step P5-1, the washed sand S8 is obtained by separating the dewatering-treatment water E1 from the secondary purified soil S7 from which the contaminants have been removed.

The coagulation/flocculation sedimentation step P6 is a step that adds a coagulant/flocculant to an aqueous suspension containing the fine-grained fraction S11, the froth F1, and the overflow F3, stirs the resulting mixture, and allows the fine-grained fraction S11 in the aqueous suspension, fine contaminant particles attached to the froth F1, and the organic substance and the contaminant particle in the overflow F3 to settle as a large floc S9, thereby separating clear purified water TW.

To the coagulation/flocculation sedimentation unit 60, the aqueous suspension is supplied, which contains the fine-grained fraction S11, the fine contaminant particles attached to the froth F1, and the overflow F3 containing the organic substance and the contaminant particle which have been separated by the up-flow washing unit 40 and have passed through the second separation unit 82, the dewatering-treatment water E1, and the dewatering-treatment water E2. In the coagulation/flocculation sedimentation step P6, a coagulant/flocculant is added to the aqueous suspension and stirred. By adding the coagulant/flocculant and stirring, the fine-grained fraction S11 and the fine organic substance or the contaminant particle in the aqueous suspension can be settled as a large floc S9. The aqueous suspension can be reused as the clear purified water TW by settling the sedimentation sludge S9. The purified water TW is transferred to and stored in a water storage tank (not shown).

The coagulant/flocculant is not particularly limited, and examples thereof include an inorganic coagulant/flocculant, a polymer flocculant, a pH adjuster, and a coagulation/flocculation aid.

The sedimentation sludge S9 is sent to the second dewatering unit 52.

The second dewatering step P5-2 is a step of dewatering the sedimentation sludge S9. In the second dewatering step P5-2, the sedimentation sludge S9 is dewatered by the second dewatering unit 52 to obtain the concentrated residue C1. The concentrated residue C1 is transported to an incineration facility capable of decomposition treatment such as high heat treatment or a managed waste disposal site and treated.

A water content separated by the dewatering is, as the dewatering-treatment water E2, sent to the coagulation/flocculation sedimentation unit 60, together with the OF containing the fine-grained fraction S11, the fine contaminant particles attached to the froth F1, and the overflow F3 containing the organic substance and contaminant particle which have been separated by the up-flow washing unit 40 and have passed through the second separation unit 82.

By the second dewatering step P5-2, the dewatering-treatment water E2 is separated from the sedimentation sludge S9, and the concentrated residue C1 having a significantly reduced volume and weight is obtained.

A part or the entirety of the purified water TW is appropriately supplied to any one of the first classifier 11, the gravel washing unit, the second classifier 12, the removal unit 30 or the up-flow washing unit 40, and may be recycled as the water W1 or the up-flow water W2. A part or the entirety of the purified water TW may be supplied to any one unit or may be supplied to two or more units. A part or the entirety of the purified water TW is supplied from the water storage tank to each process in a required amount by using a pump or the like.

The washing treatment system 1 of this embodiment can separate the coarse-grained fraction S2 having a low contaminant concentration from the contaminated soil S0, using the classifier 10.

By the classifier 10, the sand fraction S4 having a particle size within a predetermined range can be obtained from the contaminated soil S0.

It is possible to detach the contaminant phase from the surface of the sand fraction S4, using the detaching/washing unit 20.

Using the removal unit 30, the detached contaminant phase is attached to the air bubbles to form the froth F1, and the froth F1 is removed to obtain the first slurry S6 containing the primary purified soil.

Using the up-flow washing unit 40, the primary purified soil contained in the first slurry S6 is further purified to obtain the secondary purified soil S7.

Using the detaching/washing unit 20, the removal unit 30, the up-flow washing unit 40, and the first dewatering unit 51, the washed sand S8 from which contaminants have been removed is obtained.

The washing treatment system 1 of this embodiment having the configuration described above can efficiently remove the contaminant and further increase the removal efficiency of the contaminant from the contaminated soil.

In addition, the washing treatment system 1 of this embodiment can achieve both a high removal efficiency of the contaminant and a high recovery rate of the washed sand, which was not possible with the conventional classification washing techniques (screen+cyclone) or washing techniques employing surface polishing for classification washing of contaminated soils.

Further, according to the washing treatment system 1 of this embodiment, the treatment of water containing the contaminant becomes much easier, as compared to the conventional techniques which solubilize the contaminant in water with a detergent or the like to wash the contaminated soil S0.

Second Embodiment

<<Washing Treatment System>>

Figure 3:
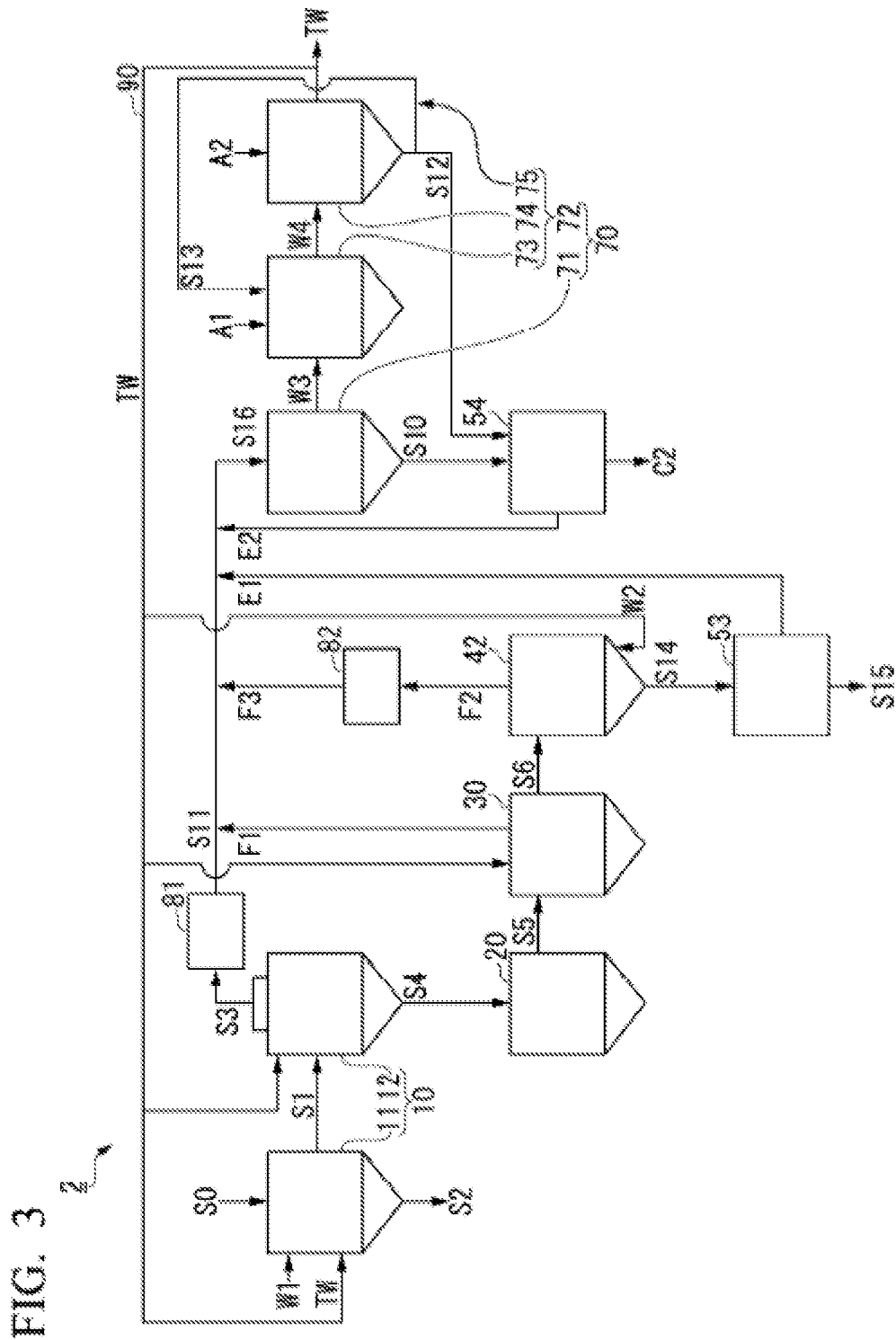
FIG. 3 is a schematic diagram showing an example of a washing treatment system for contaminated soil according to a second embodiment of this invention.

FIG. 3 shows a schematic diagram of a washing treatment system for contaminated soil according to a second embodiment of this invention. The same components as those in the first embodiment are designated by the same reference numerals, and the descriptions thereof are omitted.

As shown in FIG. 3, a washing treatment system 2 of this embodiment includes a classifier 10, a detaching/washing unit 20, a removal unit 30, an up-flow washing unit 42, a first dewatering unit 53, a second dewatering unit 54, a water treatment unit 70, a first separation unit 81, a second separation unit 82, and a purified water transfer passage 90. The classifier 10 includes a first classifier 11 and a second classifier 12. The water treatment unit 70 is configured to include a first water treatment unit 71 and a second water treatment unit 72. The second water treatment unit 72 is configured to include a mixing/adsorption tank 73, an adsorbent coagulation/flocculation sedimentation tank 74, and a coagulated material transfer unit 75.

The detaching/washing unit 20 and the first separation unit 81 are provided on a secondary side of the second classifier 12.

The up-flow washing unit 42 is provided on a secondary side of the removal unit 30.

The first dewatering unit 53 and the second separation unit 82 are provided on a secondary side of the up-flow washing unit 42.

The first water treatment unit 71 is provided on a secondary side of the removal unit 30, the first dewatering unit 53, the first separation unit 81, and the second separation unit 82.

The second dewatering unit 54 and the mixing/adsorption tank 73 are provided on the secondary side of the first water treatment unit 71.

The adsorbent coagulation/flocculation sedimentation tank 74 is provided on a secondary side of the mixing/adsorption tank 73.

The adsorbent coagulation/flocculation sedimentation tank 74 and the mixing/adsorption tank 73 are connected by a pipe for transferring a mixed solution W4.

The adsorbent coagulation/flocculation sedimentation tank 74 and the second dewatering unit 54 are connected by a pipe for transferring a surplus adsorbent coagulated material S12.

The coagulated material transfer unit 75 is configured with a pipe that returns from the adsorbent coagulation/flocculation sedimentation tank 74 to the mixing/adsorption tank 73. The coagulated material transfer unit 75 is configured with a pipe that is different from the pipe transferring the mixed solution W4.

The purified water transfer passage 90 is configured to include a pipe for discharging the purified water TW from the adsorbent coagulation/flocculation sedimentation tank 74, and pipes that connects the first classifier 11, the second classifier 12, the removal unit 30, and the up-flow washing unit 42, respectively.

The up-flow washing unit 42 is a unit that is provided downstream of the removal unit 30, and supplies the first slurry S6 into up-flow water to purify the primary purified soil.

In the up-flow washing unit 42, the up-flow from the bottom places the sand particles of the first slurry S6 in a layer expansion state. The organic substances or contaminant particles with a lower settling velocity than up-flow velocity are allowed to float and flow out together with water, as an overflow F2. The overflow F2 is sent to the second separation unit 82. The sand particles deposited on the bottom are discharged from a discharge port. Since the organic substances or contaminant particles containing the contaminant are removed as the overflow F2, the primary purified soil is further purified to obtain secondary purified soil S14.

By the up-flow washing unit 42, the primary purified soil is further purified to obtain the secondary purified soil S14.

In addition, a part of the purified water TW is supplied from the adsorbent coagulation/flocculation sedimentation tank 74 to the up-flow washing unit 42. The purified water TW may contain a trace amount of the adsorbent in some cases. The up-flow washing unit 42 can remove the adsorbent contained in the purified water TW.

Examples of the up-flow washing unit 42 include a specific gravity sorting unit equivalent to the up-flow washing unit 40.

The first dewatering unit 53 is a unit that dewaters the secondary purified soil S14 obtained by the up-flow washing unit 42 to obtain washed sand S15.

Examples of the first dewatering unit 53 include a unit equivalent to the first dewatering unit 51.

By the first dewatering unit 53, the washed sand S15 is obtained by removing water from the secondary purified soil S14.

The second dewatering unit 54 is a unit that dewaters a sedimentation sludge S10 removed in the first water treatment unit 71 to obtain a concentrated residue C2.

The concentrated residue C2 contains a contaminant at a high concentration. Examples of the concentrated residue C2 include a dewatered cake equivalent to the concentrated residue C1.

Examples of the second dewatering unit 54 include a pressure filtration unit (filter press) equivalent to the second dewatering unit 52.

The water treatment unit 70 is a unit that allows a contaminant dissolved in a second slurry S16 containing the fine-grained fraction S3, the froth F1, and the overflow F2 to be adsorbed on an adsorbent A1 to thereby obtain the purified water TW. The purified water TW is transferred to and stored in a water storage tank (not shown).

The water treatment unit 70 of this embodiment is configured to include the first water treatment unit 71 and the second water treatment unit 72.

The first water treatment unit 71 is a unit that settles and separates the suspended particles containing the contaminant from the second slurry S16 containing the fine-grained fraction S11, the froth F1, and the overflow F3 to obtain coagulation/flocculation sedimentation treated water W3. The second slurry S16 includes an OF containing the fine-grained fraction S11 that has been classified in the second classifier 12 and has passed through the first separation unit 81, the fine particles of contaminants (contaminant particles) attached to the froth F1 removed by the removal unit 30, the overflow F3 containing the organic substance and the contaminant particle which have been separated by the up-flow washing unit 40 and have passed through the second separation unit 82, the dewatering-treatment water E1 separated by the first dewatering unit 53, and the dewatering-treatment water E2 separated by the second dewatering unit 54. The suspended particles include the fine-grained fraction S11 and the contaminant particle. The sedimentation sludge S10 is sludge in which the suspended particles are coagulated and settled.

Examples of the first water treatment unit 71 include an up-flow type floc separation tank having a chemical reaction unit (not shown) that allows the second slurry S16 to react with the coagulant/flocculant, a thickener, and a unit combining these. The chemical reaction unit is provided at an inlet portion of the up-flow type floc separation tank or the thickener.

One chemical reaction unit may be used, or two or more chemical reaction units may be used in combination. When two or more chemical reaction units are used in combination, it is easy to reduce the concentration of the contaminant contained in the second slurry S16. From the viewpoint of making the washing treatment system 2 compact, one or two chemical reaction units are preferable.

The second water treatment unit 72 is a unit that brings the adsorbent A1 into contact with the coagulation/flocculation sedimentation treated water W3 and causes the contaminant dissolved in the coagulation/flocculation sedimentation treated water W3 to adsorb the adsorbent A1 to obtain purified water TW.

The second water treatment unit 72 of this embodiment includes the mixing/adsorption tank 73, the adsorbent coagulation/flocculation sedimentation tank 74, and the coagulated material transfer unit 75.

The mixing/adsorption tank 73 mixes the coagulation/flocculation sedimentation treated water W3 and the granular adsorbent A1 to obtain a mixed solution W4.

Examples of the mixing/adsorption tank 73 include a stirring tank including a water tank and a stirring blade. The number of the stirring tanks may be one, or two or more thereof may be used in combination. When two or more stirring tanks are used in combination, the contaminants dissolved in the coagulation/flocculation sedimentation treated water W3 can be more surely adsorbed on the adsorbent A1. From the viewpoint of making the washing treatment system 2 compact, one or two stirring tanks are preferable, and the mixing/adsorption tank 73 is preferably a unit including one or two stirring tanks.

The adsorbent coagulation/flocculation sedimentation tank 74 is a tank that separates the granular adsorbent A1 as the coagulated material by adding the coagulant/flocculant A2 to the mixed solution W4 to obtain the purified water TW. By separating the granular adsorbent A1 as the coagulated material from the mixed solution W4, the purified water TW having a significantly reduced contaminant concentration compared to the mixed solution W4 is obtained.

Examples of the adsorbent coagulation/flocculation sedimentation tank 74 include an up-flow type floc separation tank having a chemical reaction unit for reacting the mixed solution W4 and the coagulant/flocculant A2 and a thickener.

Examples of the water treatment unit 70 include an adsorption column is filled with the adsorbent A1, in addition to the unit having the first water treatment unit 71 and the second water treatment unit 72 described above. By the adsorption column, the purified water TW having a significantly reduced contaminant concentration compared to the coagulation/flocculation sedimentation treated water W3 is obtained. However, from the viewpoints of increasing the contact efficiency between the coagulation/flocculation sedimentation treated water W3 and the adsorbent A1 and more efficiently removing the contaminants dissolved in the coagulation/flocculation sedimentation treated water W3, the water treatment unit 70 preferably has the first water treatment unit 71 and the second water treatment unit 72.

The second water treatment unit 72 has the mixing/adsorption tank 73, whereby the mixed solution W4 in which the coagulation/flocculation sedimentation treated water W3 and the granular adsorbent A1 are mixed is obtained. For improving the efficiency (adsorption efficiency) of adsorbing the contaminant dissolved in the coagulation/flocculation sedimentation treated water W3 on the adsorbent A1 and removing the contaminants more efficiently, it is preferable that the second water treatment unit 72 includes the mixing/adsorption tank 73.

The second water treatment unit 72 has the adsorbent coagulation/flocculation sedimentation tank 74, whereby the adsorbent that has adsorbed the contaminant can be separated from the mixed solution W4. As a result, the purified water TW having a significantly reduced contaminant concentration compared to the mixed solution W4 is obtained. For this reason, it is preferable that the second water treatment unit 72 includes the adsorbent coagulation/flocculation sedimentation tank 74.

In addition, the second water treatment unit 72 has the mixing/adsorption tank 73 and the adsorbent coagulation/flocculation sedimentation tank 74, whereby the removal efficiency of contaminants is further increased. For this reason, it is more preferable that the second water treatment unit 72 has the mixing/adsorption tank 73 and the adsorbent coagulation/flocculation sedimentation tank 74.

The water treatment unit 70 preferably has the coagulated material transfer unit 75 that transfers the coagulated material from the adsorbent coagulation/flocculation sedimentation tank 74 to the mixing/adsorption tank 73. The water treatment unit 70 has the coagulated material transfer unit 75, whereby the adsorbent A1 used in the mixing/adsorption tank 73 and the reusable adsorbent S13 to be described later can be used in combination. The adsorbent A1 and the reusable adsorbent S13 are used in combination, whereby the amount of the adsorbent A1 used can be reduced. The amount of the adsorbent A1 to be used is reduced, whereby the costs required for washing the contaminated soil S0 can be significantly reduced.

The coagulated material transfer unit 75 is configured by a pipe that can transfer the coagulated material. Examples of the pipe include a pipe having a drawing pump and a pipe having a circulation pump.

The purified water transfer passage 90 transfers a part or the entirety of the purified water TW obtained by the water treatment unit 70 to any unit of the first classifier 11, a gravel washing unit (not shown), the second classifier 12, and the removal unit 30 or the up-flow washing unit 42. The purified water transfer passage 90 may transfer a part or the entirety of the purified water TW to any one unit, or to two or more units.

The washing treatment system 2 has the purified water transfer passage 90, whereby the purified water TW can be reused. The purified water TW is reused, whereby the amount of used water W1 to be introduced from the outside can be significantly reduced. Therefore, the costs required for washing the contaminated soil S0 can be significantly reduced.

<<Washing Treatment Method>>

The washing treatment method of this embodiment includes the classification step, the detaching/washing step, the removal step, the up-flow washing step, and further includes the water treatment step.

Figure 4:
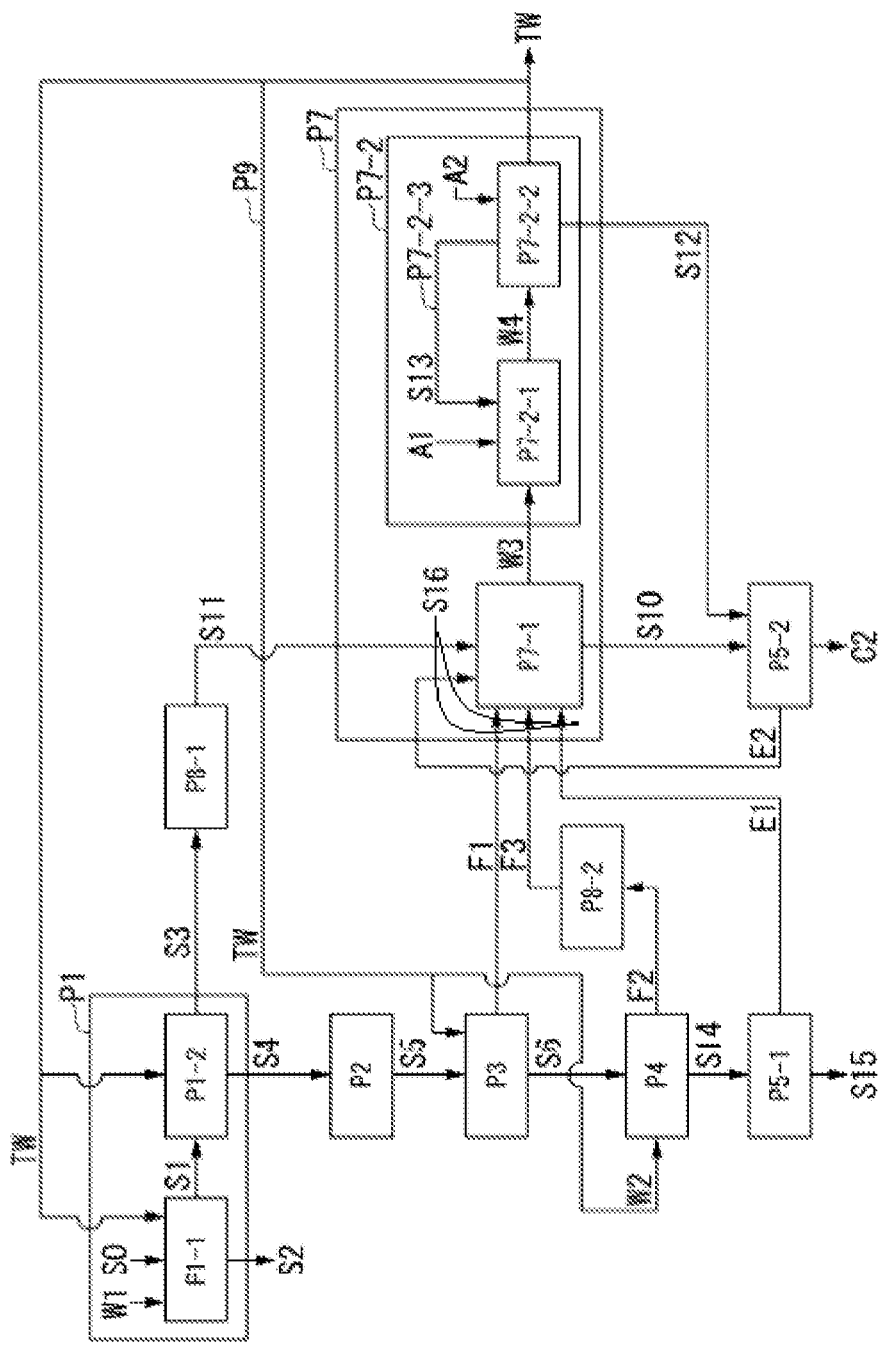
FIG. 4 is a flowchart showing an example of a washing treatment method for contaminated soil according to a second embodiment of this invention.

Hereinafter, the washing treatment method of this embodiment will be described with reference to FIGS. 3 and 4.

<Classification Step>

The classification step P1 of this embodiment is the same as the classification step P1 of the first embodiment.

<Detaching/Washing Step>

The detaching/washing step P2 of this embodiment is the same as the detaching/washing step P2 of the first embodiment.

<Removal Step>

The removal step P3 of this embodiment is the same as the removal step P3 of the first embodiment.

<Up-Flow Washing Step>

In the up-flow washing step P4 of this embodiment, in addition to the first slurry S6, the purified water TW obtained in the water treatment step P7 to be described later is supplied to the up-flow washing unit 42. In this embodiment, the adsorbent that may be contained in the purified water TW can be removed by supplying the purified water TW to the up-flow washing unit 42. Since the contaminant dissolved in water is adsorbed on the adsorbent, the contaminant can be removed more surely by removing the adsorbent.

In the up-flow washing step P4, the up-flow is generated by supplying the up-flow water W2. The first slurry S6 is supplied into the column from a supply port provided in the up-flow washing unit 42. A part of the purified water TW is, as the up-flow water W2, uniformly injected into the column from the injection port at the bottom of the up-flow washing unit 42 through the injection plate, and the injected water is allowed to rise in the column and overflow at a predetermined height from the bottom. The up-flow velocity V is represented by a linear velocity (superficial velocity), and is a value obtained by dividing the sum of the up-flow water amount from the bottom and the water amount in the first slurry S6 by the cross-sectional area of the column. The up-flow velocity V places the sand particles of the first slurry S6 in a layer expansion state similar to backwashing of sand filtration.

Based on a principle that particles with a lower settling velocity than up-flow velocity V is allowed to float, the contaminant particles containing the organic substances or the adsorbent are separated and flow out as the overflow F2. The overflow F2 containing the organic substances and the contaminant particles separated in the up-flow washing step P4 flows into the second separation unit 82.

Particles with a higher settling velocity than the up-flow velocity V is allowed to settle and are deposited on the bottom of the up-flow washing unit 42. A valve is provided at a discharge port at the bottom, such that when the deposition of sand particles reaches or exceeds a certain amount, the deposition is automatically discharged. Since the organic substances or contaminant particles with adsorbed contaminants are removed as the overflow F2, the primary purified soil is further purified to obtain the secondary purified soil S14.

<Water Treatment Step>

The water treatment step P7 is a step that allows the contaminants dissolved in the second slurry S16 containing the fine-grained fraction S11, the froth F1, and the overflow F3 to be adsorbed on the adsorbent A1 to thereby obtain the purified water TW. The water treatment step P7 of this embodiment has a first water treatment operation P7-1 and a second water treatment operation P7-2.

In the first water treatment operation P7-1, suspended particles containing contaminants are allowed to settle and are separated from the second slurry S16 containing fine-grained fraction S11, the froth F1 and the overflow F3 to thereby obtain the coagulation/flocculation sedimentation treated water W3.

In the first water treatment operation P7-1, the coagulant/flocculant and the pH adjuster are added to the second slurry S16 containing the fine-grained fraction S11, the froth F1, and the overflow F3, and are stirred, and the fine-grained fraction S11, the fine contaminant particles attached to the froth F1, and the organic substance and the contaminant particle in the overflow F3 are allowed to settle as suspended particles of large particles to obtain the coagulation/flocculation sedimentation treated water W3. The suspended particles are removed as the sedimentation sludge S10.

The washing treatment method of this embodiment has the first water treatment operation P7-1, whereby the sedimentation sludge S10 is removed from the second slurry S16 and the coagulation/flocculation sedimentation treated water W3 is obtained. In the coagulation/flocculation sedimentation treated water W3, solid content such as suspended particles has been removed. Therefore, in the second water treatment operation P7-2, the adsorption efficiency of adsorbing the contaminants dissolved in the coagulation/flocculation sedimentation treated water W3 on the adsorbent A1 can be improved and contaminants can be removed more efficiently.

The coagulant/flocculant is not particularly limited, and examples thereof include an inorganic coagulant/flocculant, a polymer flocculant, and a coagulant/flocculant aid. Examples of the inorganic coagulant/flocculant include aluminum sulfate, polyaluminum chloride, and iron salt. Examples of the polymer flocculant include polyacrylamide and polyacrylate. One kind of the coagulant/flocculant may be used alone or two or more kinds thereof may be used in combination.

The pH adjuster may be the same as or different from the pH adjuster used in the flotation chemical described above.

The coagulation/flocculation sedimentation treated water W3 is sent to the mixing/adsorption tank 73. The sedimentation sludge S10 is sent to the second dewatering unit 54.

The second water treatment operation P7-2 is an operation that brings the adsorbent A1 into contact with the coagulation/flocculation sedimentation treated water W3 and causes the contaminant dissolved in the coagulation/flocculation sedimentation treated water W3 to adsorb the adsorbent A1 to obtain the purified water TW. The second water treatment operation P7-2 of this embodiment includes a mixing/adsorption treatment P7-2-1, an adsorbent coagulation/flocculation sedimentation treatment P7-2-2, and a coagulated material transfer treatment P7-2-3.

The mixing/adsorption treatment P7-2-1 is a treatment of mixing the coagulation/flocculation sedimentation treated water W3 and the granular adsorbent A1 to obtain the mixed solution W4. In the mixing/adsorption treatment P7-2-1, the granular adsorbent A1 is added to the coagulation/flocculation sedimentation treated water W3 in the mixing/adsorption tank 73, and the mixture is stirred and mixed. As a result, the contaminants dissolved in the coagulation/flocculation sedimentation treated water W3 are adsorbed on the granular adsorbent A1. From the viewpoint of increasing the removal efficiency of contaminants dissolved in the coagulation/flocculation sedimentation treated water W3, it is preferable that the second water treatment operation P7-2 includes a mixing/adsorption treatment P7-2-1.

The adsorbent A1 is a material that adsorbs contaminants dissolved in the coagulation/flocculation sedimentation treated water W3.

Examples of the adsorbent A1 include activated carbons such as bamboo charcoal, coconut shell-based activated carbon, coal-based activated carbon, powdered activated carbon, and granular activated carbon, zeolite, activated alumina, and other adsorbents such as a synthetic adsorbent. As the adsorbent A1, activated carbon is preferable from a viewpoint of excellent contaminant adsorbability, and coconut shell-based activated carbon and coal-based activated carbon are more preferable from the viewpoint of large pore size. In addition, granular activated carbon is more preferable from the viewpoint of easy operation and management of the washing treatment system 2.

One kind of the adsorbent A1 may be used alone or two or more kinds thereof may be used in combination.

In this specification, the adsorbent A1 refers to an adsorbent with unconsumed adsorbability. Examples of the adsorbent with unconsumed adsorbability include a fresh adsorbent and an unused adsorbent. The reusable adsorbent S13 to be described later refers to an adsorbent with its adsorbability partially consumed.

The agricultural chemicals in the contaminated soil S0 are often deteriorated or decomposed due to various external factors such as lapse of time, soil environment, and rainfall. Therefore, the amount of absorbent A1 added and the residence time thereof can be appropriately adjusted through experimental examination.

In the mixing/adsorption treatment P7-2-1, it is preferable to use the adsorbent A1 and the reusable adsorbent S13 in combination. When the adsorbent A1 and the reusable adsorbent S13 are used in combination, the amount of the adsorbent A1 to be used can be reduced. When the amount of the adsorbent A1 to be used is reduced, the costs required for washing the contaminated soil S0 can be significantly reduced.

In the mixing/adsorption treatment P7-2-1, it is preferable to use the adsorbent A1 from the viewpoint of further increasing the contaminant removal efficiency.

The mixing ratio between the adsorbent A1 and the reusable adsorbent S13 can be appropriately adjusted according to kind, concentration, morphology, and the like of the contaminant dissolved in the coagulation/flocculation sedimentation treated water W3.

By the mixing adsorption/treatment P7-2-1, the mixed solution W4 is obtained. The mixed solution W4 is sent to the adsorbent coagulation/flocculation sedimentation tank 74.

The adsorbent coagulation/flocculation sedimentation treatment P7-2-2 is a treatment that separates the granular adsorbent A1 as the coagulated material by adding the coagulant/flocculant A2 to the mixed solution W4 to obtain the purified water TW.

A method of separating the coagulated material is not particularly limited, and examples thereof include a method of allowing the coagulated material to settle on the bottom of the adsorbent coagulation/flocculation sedimentation tank 74 and then removing the coagulated material with a drawing pump or the like.

The adsorbent to be coagulated in the adsorbent coagulation/flocculation sedimentation treatment P7-2-2 may include the reusable adsorbent S13 in addition to the adsorbent A1.

From the viewpoint of easily coagulating and collecting the adsorbent, the polymer flocculant described above is preferable as the coagulant/flocculant A2.

The coagulated materials separated in the adsorbent coagulation/flocculation sedimentation tank 74 are divided into the surplus adsorbent coagulated material S12 and the reusable adsorbent S13. When the polymer flocculant is used as the coagulant/flocculant A2, a part of the coagulated material is converted back to original particulate adsorbent A1 due to cancellation of cross-linking action of the polymer flocculant inside the pump (not shown) and the pipe of the coagulated material transfer unit 75, and is transferred to the mixing/adsorption tank 73 as the reusable adsorbent S13.

The rest of the coagulated material is discharged to the outside of the adsorbent coagulation/flocculation sedimentation tank 74, as the surplus adsorbent coagulated material S12. The surplus adsorbent coagulated material S12 is transferred to the second dewatering unit 54 and dewatered together with the sedimentation sludge S10.

The adsorbent A1 with the adsorbed contaminant is removed as the coagulated material. As a result, in the purified water TW, the contaminant concentration is significantly reduced compared to the coagulation/flocculation sedimentation treated water W3. The purified water TW is transferred to and stored in a water storage tank (not shown).

A part or the entirety of the purified water TW is appropriately supplied to any unit of the first classifier 11, the gravel washing unit, the second classifier 12, the removal unit 30 or the up-flow washing unit 42, and may be recycled as the water W1 or the up-flow water W2. A part or the entirety of the purified water TW may be supplied to any one unit or may be supplied to two or more units. A part or the entirety of the purified water TW is supplied from the water storage tank to each process in a required amount by using a pump or the like.

The adsorbent to be removed as the coagulated material may include the reusable adsorbent S13 in addition to the adsorbent A1.

The entire amount of surplus adsorbent coagulated material S12 may be transferred to the second dewatering unit 54 and dewatered together with the sedimentation sludge S10 to form a concentrated residue C2. A part of the surplus adsorbent coagulated material S12 may be transferred to the coagulated material transfer unit 75 and used as the reusable adsorbent S13. From the viewpoint of reducing the cost required for washing the contaminated soil S0, it is preferable to reuse a part of the surplus adsorbent coagulated material S12 as the reusable adsorbent S13 in the mixing/adsorption treatment P7-2-1. Therefore, it is preferable that the water treatment step P7 includes the coagulated material transfer treatment P7-2-3 for transferring the coagulated material separated in the adsorbent coagulation/flocculation sedimentation treatment P7-2-2 to the mixed solution W4 in the mixing/adsorption tank 73. In the coagulated material transfer treatment P7-2-3, the coagulated material is transferred from the adsorbent coagulation/flocculation sedimentation tank 74 to the mixing/adsorption tank 73 via the coagulated material transfer unit 75.

The water treatment step P7 of this embodiment may include a coagulated material transfer operation for transferring the coagulated material from the adsorbent coagulation/flocculation sedimentation tank 74 to the first water treatment unit 71. Since the water treatment step P7 includes this coagulated material transfer operation for transferring the coagulated material to the first water treatment unit 71, when the adsorbent A1 is used in the first water treatment unit 71, the adsorbent A1 and the reusable adsorbent S 13 can be used in combination and the costs required for washing the contaminated soil S0 can be significantly reduced. For this reason, it is preferable that the water treatment step P7 includes the coagulated material transfer operation for transferring the coagulated material to the first water treatment unit 71.

By the water treatment unit 70, the purified water TW and the surplus adsorbent coagulated material S12 are obtained.

<Other Steps>

The washing treatment method of this embodiment may have other steps, in addition to the classification step P1, the detaching/washing step P2, the removal step P3, the up-flow washing step P4, and the water treatment step P7. Examples of other steps include a first separation step P8-1, a second separation step P8-2, a first dewatering step P5-1, a second dewatering step P5-2, and a purified water transfer step P9.

The first separation step P8-1 of this embodiment is the same as the first separation step P8-1 of the first embodiment.

The second separation step P8-2 of this embodiment is the same as the second separation step P8-2 of the first embodiment.

The first dewatering step P5-1 is a step of dewatering the secondary purified soil S14 to obtain the washed sand S15. In the first dewatering step P5-1, the secondary purified soil S14 is dewatered by the first dewatering unit 53 and collected as washed sand S15. Since the washed sand S15 is obtained through the detaching/washing step P2, the removal step P3, and the up-flow washing step P4, the concentration of contaminant is sufficiently reduced. The washed sand S15 can be reused when the contaminant concentration is not higher than the soil environmental criteria. When the concentration exceeds the soil environmental criteria, the washing treatment is performed again. When the concentration of contaminants in the washed sand S15 exceeds the soil environmental criteria even after the second washing treatment, the washed sand is transported to an incineration facility capable of decomposition treatment such as high heat treatment or a managed waste disposal site and treated.

A water content separated by the dewatering is, as the dewatering-treatment water E1, sent to the water treatment unit 70, together with the OF containing the fine-grained fraction S11, the fine contaminant particles attached to the froth F1, and the overflow F3 which has been separated by the up-flow washing unit 40 and has passed through the second separation unit 82.

By the first dewatering step P5-1, the washed sand S15 is obtained by separating the dewatering-treatment water E1 from the secondary purified soil S14 from which the contaminants have been removed.

The second dewatering step P5-2 is a step of dewatering the sedimentation sludge S10 and the surplus adsorbent coagulated material S12. In the second dewatering step P5-2, the sedimentation sludge S10 and the surplus adsorbent coagulated material S12 are dewatered by the second dewatering unit 54 to obtain the concentrated residue C2. The concentrated residue C2 is transported to an incineration facility capable of decomposition treatment such as high heat treatment or a managed waste disposal site and treated.

A water content separated by the dewatering is, as the dewatering-treatment water E2, sent to the first water treatment unit 71, together with the OF containing the fine-grained fraction S11, the fine contaminant particles attached to the froth F1, and the organic substance or the contaminant particle in the overflow F3, and the dewatering-treatment water E1.

By the second dewatering step P5-2, the dewatering-treatment water E2 is separated from the sedimentation sludge S10, and the surplus adsorbent coagulated material S12, and thus the concentrated residue C2 having a significantly reduced volume and weight is obtained.

The purified water transfer step P9 is a step of transferring a part or an entirety of the purified water TW to any unit of the first classifier 11, the gravel washing unit (not shown), the second classifier 12, the removal unit 30, or the up-flow washing unit 42. In the purified water transfer step P9, the part or entirety of the purified water TW is transferred to each process of the washing treatment system 2 via the purified water transfer passage 90. In the purified water transfer step P9, the part or entirety of the purified water TW may be transferred to any one unit, or may be transferred to two or more units.

By the purified water transfer step P9, the part or entirety of the purified water TW can be reused in each process of the washing treatment system 2.

By the washing treatment system 2 of this embodiment, it is possible to remove the dissolved contaminants eluted in the water used for the washing treatment of the contaminated soil.

Furthermore, by the washing treatment system 2 of this embodiment, the purified water TW can be reused.

Although this invention's washing treatment system and washing treatment method for the contaminated soil have been described above, this invention is not limited to the embodiments described above, and can be appropriately modified without departing from the spirit of this invention.

For example, in the washing treatment system, the classifier 10 may be configured of one classifier.

The detaching/washing unit 20 and the removal unit 30 may be integrated into one unit having both functions of these units.

A part or the entirety of the purified water TW may be supplied to and reused by any unit of the first water treatment unit 71, the mixing/adsorption tank 73, or the adsorbent coagulation/flocculation sedimentation tank 74.

The washing treatment system may supply the part or entirety of the purified water TW to any one unit, or to two or more units.

In the embodiments described above, the OF including the fine-grained fraction S11, the froth F1, the overflow F3, the dewatering-treatment water E1, and the dewatering-treatment water E2 are mixed and then supplied to the first water treatment unit 71. Alternatively, the OF containing the fine-grained fraction S11, the froth F1, the overflow F3, the dewatering-treatment water E1, and the dewatering-treatment water E2 may be mixed before being supplied to the first water treatment unit 71. The OF containing the fine-grained fraction S11, the froth F1, the overflow F3, the dewatering-treatment water E1, and the dewatering-treatment water E2 may be separately supplied to the first water treatment unit 71 and mixed inside the first water treatment unit 71.

From the viewpoints of easy supply of the OF containing the fine-grained fraction S11 and improving work efficiency, it is preferable that the OF containing the fine-grained fraction S11, the froth F1, the overflow F3, the dewatering-treatment water E1, and the dewatering-treatment water E2 are mixed before being supplied to the first water treatment unit 71.

When the dissolved contaminant concentration eluted in the second slurry S16 is low, the adsorbent A1 may be added to the first water treatment unit 71. In this instance, the second water treatment unit 72 can be omitted.

When the adsorbent A1 has a high adsorbability, the adsorbent A1 may be added to the first water treatment unit 71. In this instance, the second water treatment unit 72 can be omitted.

From the viewpoint of increasing the adsorption efficiency of contaminants to the adsorbent A1 and more surely having the contaminants adsorbed onto the adsorbent A1, it is preferable that the washing treatment system includes the first water treatment unit 71 and the second water treatment unit 72.

EXAMPLES

Hereinafter, this invention will be described in more detail with reference to examples, but this invention is not limited to these examples.

Examples 1 to 26

Using the washing treatment system 1 having units with their scales shown in Table 1, a washing treatment test was conducted on contaminated soil having a contaminant concentration shown in Table 2. In addition, agricultural chemicals (2,4-D, and 2,4,5-T) were included as the contaminant, but the agricultural chemicals were excluded from the evaluation targets due to the low concentration thereof. That is, the contaminants in these examples are dioxins.

The environmental criterion for dioxins in Japan and Germany is 1000 pg-TEQ/g or lower. In Vietnam, the environmental criterion for dioxins varies depending on the land use, that is, 300 pg-TEQ/g or lower for residential areas, 600 pg-TEQ/g or lower for parks and green spaces, and 1200 pg-TEQ/g or lower for commercial or industrial land.

TABLE 1

|  |  | Length (mm) | Width (mm) | Height (mm) | Tank capacity (m³) | Weight (t) | Electric power (kW) |
|---|---|---|---|---|---|---|---|
| First classifier 11 | Vibrating wet screen | 6000 | 4200 | 5600 | — | 23.0 | 11 |
| Second classifier 12 | Hydrocyclone | 900 | 700 | 2200 | — | 6.2 | 55 |
| Detaching/washing unit 20 | Scrubber | 6300 | 1400 | 2500 | 5.3 | 12.0 | 66 |
| Removal unit 30 | Flotation unit | 12000 | 2200 | 2700 | 18.3 | 21.7 | 78 |
| Up-flow washing unit 40 | Up-flow column | 2700 | 2700 | 4100 | 11 | 9.6 | 30 |
| First dewatering unit 51 | Dewatering screen | 6000 | 4200 | 5100 | — | 15.4 | 11 |
| Coagulation/sedimentation unit 60 | Thickener | 8200 | 2200 | 5100 | 167 | 16.9 | 5 |
| Second dewatering unit 52 | Filter press | 11000 | 5700 | 6500 | — | 51.0 | 14 |

Feeds were classified according to the contaminant concentration in the contaminated soil (original soil and feed). In the feeds, a concentration of lower than 4000 pg-TEQ/g was set as a low concentration region (Examples 1 to 6), a concentration of 4000 pg-TEQ/g or higher and lower than 8000 pg-TEQ/g was set as a medium concentration region (Examples 7 to 14), a concentration of 8000 pg-TEQ/g or higher and lower than 16000 pg-TEQ/g was set as a high concentration region (Examples 15 to 22), and a concentration of 16000 pg-TEQ/g or higher was set as a very high concentration region (Examples 23 to 26).

The contaminant concentration (concentration of dioxins) of the washed sand (also referred to as washed soil) obtained by using the washing treatment system 1 was measured. The concentration of dioxins was measured, in an accredited measurement certification office (analysis company), by extracting dioxins contained in the feed and the washed sand (washed soil) by a series of extraction operations (such as Soxhlet extraction) and a cleanup operation, with a high resolution gas chromatograph mass spectrometer (GC/MS). The contaminant removal efficiency (dioxins removal efficiency) was calculated by the following Formula (II). The results are shown in Table 2.

[Mathematical Formula 2]

$$\text{Removal efficiency (\%)} = \left(1 - \frac{C_{cleansand}}{C_{feedsoil}}\right) \times 100 \quad \text{(II)}$$

$C_{cleansand}$:
Dioxins concentration (pg-TEQ/g) in clean sand (clean soil)

$C_{feedsoil}$: Dioxins concentration
(pg-TEQ/g) in contaminated soil (original soil)

In Formula (II), "Removal efficiency (%)" represents a dioxins removal efficiency. "$C_{clean\ sand}$" represents the dioxin concentration (pg-TEQ/g) in the washed sand (washed soil). "$C_{feed\ soil}$" represents the dioxin concentration (pg-TEQ/g) in the contaminated soil (original soil).

TABLE 2

|  | Contaminant concentration (pg · TEQ/g) | | Removal efficiency of contaminant (%) |
|---|---|---|---|
|  | Contaminated soil | Washed sand | |
| Example 1 | 1425 | 93 | 93.5 |
| Example 2 | 1900 | 110 | 94.2 |
| Example 3 | 2400 | 130 | 94.6 |
| Example 4 | 2500 | 150 | 94.0 |
| Example 5 | 3452 | 237 | 93.1 |
| Example 6 | 3500 | 190 | 94.6 |
| Example 7 | 4146 | 111 | 97.3 |
| Example 8 | 5300 | 290 | 94.5 |
| Example 9 | 5622 | 349 | 93.8 |
| Example 10 | 5783 | 209 | 96.4 |
| Example 11 | 6000 | 200 | 96.7 |
| Example 12 | 6500 | 380 | 94.2 |
| Example 13 | 6500 | 430 | 93.4 |
| Example 14 | 6800 | 450 | 93.4 |
| Example 15 | 8991 | 435.3 | 95.2 |
| Example 16 | 11000 | 540 | 95.1 |
| Example 17 | 12000 | 710 | 94.1 |
| Example 18 | 12000 | 610 | 94.9 |
| Example 19 | 12000 | 680 | 94.3 |
| Example 20 | 13369 | 643.3 | 95.2 |
| Example 21 | 14000 | 730 | 94.8 |
| Example 22 | 15424 | 692.3 | 95.5 |
| Example 23 | 16000 | 1100 | 93.1 |
| Example 24 | 17258 | 1051 | 93.9 |
| Example 25 | 17860 | 703 | 96.1 |
| Example 26 | 20000 | 910 | 95.5 |

As shown in Table 2, for the feed of low concentration region, washed sand that satisfied the environmental criteria for dioxins used in residential areas, parks and green spaces in Vietnam was obtained. For the feed of medium concentration region, washed sand that satisfied the environmental criteria for dioxins used in residential areas, parks and green spaces in Vietnam was obtained. For the feed of high concentration region, washed sand that satisfied the environmental criteria for dioxins used in parks and green spaces, or in commercial or industrial land in Vietnam was obtained. For the feed of very high concentration region, washed sand that satisfied the environmental criteria for dioxins used in commercial or industrial land in Vietnam was obtained.

That is, it was confirmed that, for the contaminated soil having a concentration of at most 20000 pg-TEQ/g, the washed sand that satisfies the environmental criterion for dioxins in Vietnam can be produced.

As a result of analyzing the dioxin concentration in the treated water obtained by the washing treatment test, the dioxin concentration in the water was lower than a lower limit of quantification in each of the examples.

In addition, in Examples 1 to 26 to which this invention was applied, a very high contaminant removal efficiency of 93% or higher was achieved.

It was found that this invention enables the one or more contaminants selected from dioxins and agricultural chemicals to be more surely removed.

INDUSTRIAL APPLICABILITY

The washing treatment system and the washing treatment method of this invention can be widely applied to the use of washing treatment of contaminated soil containing harmful substances such as dioxins or agricultural chemicals.

REFERENCE SIGNS LIST 1, 2 Washing treatment system for contaminated soil
10 Classifier
11 First classifier
12 Second classifier
20 Detaching/washing unit
30 Removal unit
40, 42 Up-flow washing unit
51, 53 First dewatering unit
52, 54 Second dewatering unit
60 Coagulation/flocculation sedimentation unit
70 Water treatment unit
71 First water treatment unit
72 Second water treatment unit
73 Mixing/adsorption tank
74 Adsorbent coagulation/flocculation sedimentation tank
75 Coagulated material transfer unit
81 First separation unit
82 Second separation unit
90 Purified water transfer passage
S0 Contaminated soil
S1 Soil
S2 Coarse-grained fraction
S3, S11 Fine-grained fraction
S4, S5 Sand fraction
S6 First slurry
S7, S14 Secondary purified soil
S8, S15 Washed sand
S9, S10 Sedimentation sludge
S12 Surplus adsorbent coagulated material
S13 Reusable adsorbent
S14 Purified Soil
S15 Washed sand
S16 Second slurry
W1 Water
W2 Up-flow water
W3 Coagulation/sedimentation treated water
W4 Mixed solution
TW Purified water
E1, E2 dewatering-treatment water
F1 froth (foam)
F2, F3 Overflow
C1, C2 Concentrated residue
A1 Adsorbent
A2 Coagulant/flocculant

What is claimed is:

1. A washing treatment system for contaminated soil, comprising:
   a classifier that is configured to obtain a sand fraction having a particle size within a predetermined range and a fine-grained fraction having a particle size smaller than the predetermined range, from contaminated soil containing one or more contaminants selected from dioxins and agricultural chemicals;
   a detaching unit that is configured to detach contaminant-bearing particles containing the one or more contaminants from a surface of the sand fraction;
   a removal unit that is configured to generate air bubbles in a presence of water containing a flotation chemical, allow the detached contaminant-bearing particles to attach to the air bubbles to form froth, and remove the froth to obtain a first slurry containing primary purified soil;
   an up-flow washing unit comprising a bottom that is provided downstream of the removal unit and is configured to feed the first slurry into up-flow water to purify the primary purified soil, wherein the up-flow water is supplied into the up-flow washing unit from the bottom and washes the first slurry in the up-flow washing unit;
   a first separation unit that is configured to separate and remove an organic substance or contaminant-bearing particles having a particle size larger than the predetermined range from the fine-grained fraction; and
   a coagulation/sedimentation unit that is configured to add a coagulant to an aqueous suspension containing the fine-grained fraction withdrawn from the first separation unit and the froth, thereby obtaining clear purified water.

2. The washing treatment system according to claim 1, wherein the detaching unit is a scrubber comprising a stirring tank and a stirring blade.

3. The washing treatment system according to claim 2, further comprising:
   a water treatment unit that is configured to bring the one or more contaminants dissolved in a second slurry with an adsorbent to obtain purified water, wherein the secondary slurry is a mixture of the fine-grained fraction withdrawn from the classification step, the froth withdrawn from the removal step, and an overflow withdrawn from the up-flow washing step.

4. The washing treatment system according to claim 1, further comprising:
   a water treatment unit that is configured to bring the one or more contaminants dissolved in a second slurry containing the fine-grained fraction and the froth into contact with an adsorbent to obtain purified water.

5. The washing treatment system according to claim 1, further comprising:
   a second separation unit that is provided downstream of the up-flow washing unit and is configured to separate and remove an organic substance or contaminant-bearing particles having a particle size larger than the predetermined range from overflow flown out from the up-flow washing unit.

6. A washing treatment method for contaminated soil, comprising:
   a classification step of obtaining a sand fraction having a particle size within a predetermined range and a fine-grained fraction having a particle size smaller than the predetermined range, from contaminated soil containing one or more contaminants selected from dioxins and agricultural chemicals;
   a detaching step of detaching contaminant-bearing particles containing the one or more contaminants from a surface of the sand fraction;
   a removal step of generating air bubbles in a presence of water containing a flotation chemical, causing the detached contaminant-bearing particles to attach to the air bubbles to form froth, and removing the froth to obtain a first slurry containing primary purified soil;

an up-flow washing step, as a step subsequent to the removal step, of feeding the first slurry into up-flow water in an up-flow washing unit comprising a bottom to purify the primary purified soil, wherein the up-flow water is supplied into the up-flow washing unit from the bottom and washes the first slurry in the up-flow washing unit;

a first separation step of separating and removing an organic substance or contaminant-bearing particles having a particle size larger than the predetermined range from the fine-grained fraction; and a coagulation/sedimentation step of adding a coagulant to an aqueous suspension containing the fine-grained fraction withdrawn from the first separation step and the froth, thereby obtaining clear purified water.

7. The washing treatment method according to claim 6, wherein the detaching step comprises an operation of scrubbing particles of the sand fraction together by using a scrubber having a stirring tank and a stirring blade.

8. The washing treatment method according to claim 7, further comprising:

a water treatment step of bringing the one or more contaminants dissolved in a second slurry with an adsorbent to obtain purified water, wherein the secondary slurry is a mixture of the fine-grained fraction withdrawn from the classification step, the froth withdrawn from the removal step, and an overflow withdrawn from the up-flow washing step.

9. The washing treatment method according to claim 8, wherein the flotation chemical is a chemical reagent that does not allow dissolution of the one or more contaminants in water.

10. The washing treatment method according to claim 7, wherein the flotation chemical is a chemical reagent that does not allow dissolution of the one or more contaminants in water.

11. The washing treatment method according to claim 6, further comprising:

a water treatment step of bringing the one or more contaminants dissolved in a second slurry with an adsorbent to obtain purified water, wherein the secondary slurry is a mixture of the fine-grained fraction withdrawn from the classification step, the froth withdrawn from the removal step, and an overflow withdrawn from the up-flow washing step.

12. The washing treatment method according to claim 11, wherein the flotation chemical is a chemical reagent that does not allow dissolution of the one or more contaminants in water.

13. The washing treatment method according to claim 6, wherein the flotation chemical is a chemical reagent that does not allow dissolution of the one or more contaminants in water.

14. The washing treatment method according to claim 6, further comprising:

a second separation step, as a step subsequent to the up-flow washing step, of separating and removing an organic substance or contaminant-bearing particles having a particle size larger than the predetermined range from overflow flown out from the up-flow washing step.

* * * * *